(12) United States Patent  (10) Patent No.: US 6,859,572 B2
Ishibashi  (45) Date of Patent: Feb. 22, 2005

(54) PHOTON OPERATING DEVICE AND PHOTON OPERATING METHOD

(75) Inventor: Akira Ishibashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/822,062

(22) Filed: Mar. 30, 2001

(65) Prior Publication Data

US 2002/0015573 A1 Feb. 7, 2002

(30) Foreign Application Priority Data

Mar. 31, 2000 (JP) .................................... P2000-101272

(51) Int. Cl.⁷ .............................. G02B 6/26; G02B 6/42
(52) U.S. Cl. ......................... 385/16; 345/173; 345/176; 385/30; 385/31; 385/32
(58) Field of Search ..................... 385/15–18, 30–32, 385/81, 12, 147, 901, 37, 13; 345/173–177, 45, 76, 81

(56) References Cited

U.S. PATENT DOCUMENTS

| 4,329,058 A | * | 5/1982 | James et al. .................. 356/44 |
| 4,640,592 A | * | 2/1987 | Nishimura et al. ........... 345/60 |
| 4,710,760 A | * | 12/1987 | Kasday ..................... 178/18.09 |
| 5,291,827 A | * | 3/1994 | Liers et al. ................. 101/424 |
| 5,596,671 A | * | 1/1997 | Rockwell, III .............. 385/147 |
| 5,820,265 A | * | 10/1998 | Kleinerman ........... 250/227.14 |
| 5,962,967 A | * | 10/1999 | Kiryuschev et al. ........ 313/491 |
| 6,028,977 A | * | 2/2000 | Newsome .................... 250/330 |
| 6,333,735 B1 | * | 12/2001 | Anvekar ..................... 345/175 |
| 6,359,608 B1 | * | 3/2002 | Lebrun et al. .............. 345/100 |

* cited by examiner

Primary Examiner—Richard H Kim
(74) Attorney, Agent, or Firm—Sonnenschein, Nath & Rosenthal LLP

(57) ABSTRACT

A photon operating device is capable of more effectively using five senses and muscular or other functions humans have, and capable of performing various kinds of information processing as high-level interface connecting image information of natural worlds and human brains. The photon operating device comprises a plurality of first optical fibers, a plurality of second optical fibers, which both are arranged in form of a grating on a two-dimensional plane, semiconductor lasers and CCD line sensors, which both are disposed at one-side ends and the other ends of the first optical fibers, respectively. A photon beam introduced from a light source into one end of a selected first optical fiber is divided into two correlated dual signals, i.e. a first signal traveling through the selected first optical fiber and a second signal led out from the selected first optical fiber externally of the two-dimensional plane, at an intersection between the first and second optical fibers by an optical switch. The fist signal led out from the other end of the selected first optical fiber is detected by a CCD line sensor.

20 Claims, 22 Drawing Sheets

SCATTERED LIGHT

SCATTERED LIGHT

PHOTON OPERATING DEVICE AND PHOTON OPERATING METHOD

RELATED APPLICATION DATA

The present application claims priority to Japanese Application No. P2000-101272 filed Mar. 31, 2000, which application is incorporated herein to the extent permitted by law.

BACKGROUND OF THE INVENTION

This invention relates to a photon operating device and a photon operating method, suitable for use in display devices, environment monitors, touch sensors and other various applications, for example.

Although CRT displays have been most popularly used as display devices, other displays such as liquid crystal displays (LCD) and plasma display panels (PDP) have come to be introduced recently.

However, CRT displays merely give users cold and hard texture of glass when users touch their screens. This is not changed even with appearance of other displays like LCD and PDP. In this sense, conventional displays remain within a primitive stage regarding the interface between human brains and the externality, that is, the function as UI (user interface).

On the other hand, humans have five senses, namely, three remotely discernible senses (visible sense, auditory sense, olfactory sense) and two proximately discernible senses (tactile sense, gustatory sense), and in addition to those, they have muscular powers. However, since conventional displays and other electronic devices are still low in UI function, it is not believed that creativity is performed by every one. Further, the functions of a display, monitor, touch sensor and receiver (regarding received signals, if a typical camera, CCD or the like is used, coupling and synergism of its output and display signal) have not been united yet.

In the era of progressively high-leveled networks, those information communication techniques, which are rather lopsided, involve the possibility of rendering humans quasi-malnourished and inviting hazards from the standpoints of maintaining or developing salutary sensory functions, and further from the standpoint of brain evolution.

OBJECTS AND SUMMARY OF THE INVENTION

It is therefore an object of the invention to provide a photon operating device and a photon operating method capable of more effectively utilizing five senses and muscular powers humans have, and capable of performing various kinds of information processing as high-level interface connecting image information of natural worlds and human brains.

Another object of the invention is to provide a photon operating device and a photon operating method that are simple in structure, easy to increase the screen area, unlikely to produce distortion along edges of the display plane during reproduction of a large solid angle image when the screen area is large-scaled, quickly responsive, capable of changing the shape of the display plane to various shapes including a concave shape, if necessary, extendible, light, thin and flexible.

According to the first aspect of the invention, there is provided a photon operating device characterized in using dual signals correlated to each other, which are obtained by dividing a photon beam.

In the first aspect of the invention, paths of photons are typically disposed in a two-dimensional plane, and one of the dual signals is transmitted through within the paths whereas the other of the dual signals is led out from the path externally of the two-dimensional plane. More specifically, paths of photons are provided by a plurality of first optical fibers or optical waveguides and a plurality of second optical fibers or optical waveguides that are disposed in form of a grating in a two-dimensional plane, and a photon beam introduced into a selected of first optical fiber or optical waveguide is divided to create the dual signals correlated to each other, one of which is transmitted through within selected the first optical fiber or optical waveguides, and the other of which is led out from the selected optical fiber or optical waveguide externally of the two-dimensional plane and again introduced into the selected first optical fiber or optical waveguide via a selected second optical fiber or optical waveguide to join with said one of the dual signals. This is especially suitable for use in parallel operations.

Alternatively, paths of photons are provided by a plurality of first optical fibers or optical waveguides and a plurality of second optical fibers or optical waveguides that are disposed in form of a grating in a two-dimensional plane, and one of the dual signals is transmitted through within the selected first optical fiber or optical waveguides whereas the other of the dual signals is led out from the selected first optical fiber or optical waveguide externally of the two-dimensional plane, one of the dual signals, which is an inversion signal of the other of the dual signals led out externally of the two-dimensional plane, being stored in storage means synchronously with leading out the other of the dual signals externally of the two-dimensional plane.

The other of the dual signals led out externally of the two-dimensional plane is typically an image signal in form of light. The image signal can be recognized and/or analyzed by acquiring difference in time and/or space of the inversion signal. Alternatively, a result of recognition and/or analysis of the image signal may be fed back to an image signal for the next display. The inversion signal contains information about optical intensity, color or polarization, for example. The inversion signal can be used for analysis of time and space for physical access to the two-dimensional plane from the exterior. The physical access is an external pressure, for example. A position of the physical access on the two-dimensional plane can be detected by using the other of the dual signals as a guide signal for a user and using the inversion signal as a signal carrying information for the physical access.

Typically, a light source and a photo detector are disposed at one and the other ends of each first optical fiber or optical waveguide. The photo detector is connected to a shift register, for example. Although a semiconductor laser is preferably used as the light source, a light emitting diode may be use as well. A charge coupled device (CCD) may be used as the photo detector. An optical switch is typically used to lead out the other of said dual signals externally of said two-dimensional plane.

According to the second aspect of the invention, there is provided a photon operating device using dual signals correlated to each other, which are obtained by dividing a photon beam, comprising:

a plurality of first optical fibers or optical waveguides and a plurality of second optical fibers or optical waveguides that are disposed in form of a grating in a two-dimensional plane; and a light source and a photo detector disposed at one and the other ends of each first optical fiber or optical waveguide, a photon beam introduced from the light source into selected one of the first optical fibers or optical waveguides being divided at one of intersection points of the first optical fibers or optical waveguides and the second optical fibers or optical waveguides by an optical switch using light-to-light interaction to create dual signals correlated to each other, one of which is a first signal transmitted through within the selected first optical fiber or optical waveguide, and the other of which is a second signal led out from the selected first optical fiber or optical waveguide externally of the two-dimensional plane, the first signal led out from the other end of the selected first optical fiber or optical waveguide being detected by one of the photo detectors.

In the second aspect of the invention, a semiconductor laser is preferably used as the light source, but a light emitting diode may be used as well. Typically, the first optical fibers or optical waveguides include those for red, those for green and those for blue, a light source for red emission being provided at one end each first optical fiber or optical waveguide for red, a light source for green emission being provided at one end of each first optical fiber or optical waveguide for green, and a light source for blue emission being provided at one end of each first optical fiber or optical waveguide for blue. The light source for red emission, light source for green emission and light source for blue emission are typically semiconductor lasers. For example, the first optical fibers or optical waveguides and the second optical fibers or optical waveguides are disposed to form a curved plane.

According to the third aspect of the invention, there is provided a photon operating device using dual signals correlated to each other, which are obtained by dividing a photon beam, comprising:

a plurality of optical fibers or optical waveguides having liquid cores and a plurality of control signal lines that are disposed in form of a grating in a two-dimensional plane; and a light source and a photo detector disposed at one and the other ends of each optical fiber or optical waveguide, a photon beam introduced from the light source into selected one of the optical fibers or optical waveguides being divided at one of intersection points of the optical fibers or optical waveguides and the control signal lines by one of optical switches using light-scattering elements in the cores to create dual signals correlated to each other, one of which is a first signal transmitted through within the selected optical fiber or optical waveguides, and the other of which is a second signal led out from the selected optical fiber or optical waveguide externally of the two-dimensional plane, the first signal led out from the other end of the selected optical fiber or optical waveguide being detected by one of the photo detectors.

In the third aspect of the invention, typical light scattering elements are bubbles. Explanation is made here about generation of the bubbles by a piezoelectric element. That is, in general, when ultrasonic waves generated by a piezoelectric element are propagated, a liquid swings and begins to perform its power of scattering light due to local variance in density. However, this local variance in density is a continuous change, and its light scattering power is not high. In order to enhance the light scattering power, it will be effective to introduce dissolved gas as a guest into a host liquid, evaporate it with ultrasonic waves and thereby bring about multi-refraction along the well-defined (and therefore producing a large discontinuity in refractive index) boundary between the gas and the liquid. In this case, however, since generated bubbles do not disappear soon (which results in early loosing the dissolved gas), this technique cannot be used in the display apparatus.

To overcome the problem, it is effective to use cavitation for generating bubbles. By using a host liquid having an appropriate vapor pressure and ultrasonic waves of an appropriate intensity, bubbles are generated by cavitation. This is a critical process, and bubbles are made of molecules of the host liquid. Therefore, the process can be repeated quickly.

In response to the saturation vapor pressure of the liquid, sound pressure on the outer circumferential surface of the optical fiber or optical waveguide given from the piezoelectric element, and the distance from the core center axis, cavitation is brought about near the core center axis, bubbles of vapor of the liquid can be generated. Refractive index of a liquid, in general, is about 1.3 through 1.9, and that of the bubbles is approximately 1. Therefore, light can be scattered very efficiently by bubbles.

When the cavitation number is $C_n$(dimensionless number), it can be expressed as:

$$C_n = (p_0 - p')/(\rho v^2/2) \qquad (1)$$

where $p_0$ is the pressure in a still liquid, p' is the saturation vapor pressure of the liquid, $\rho$ is the density of the liquid, and v is the velocity of an object. Near an object moving sufficiently fast in a liquid, the pressure drops according to the Bernoulli's law to a value smaller than the saturation vapor pressure of the liquid, it may occurs that $C_n$ becomes negative. That is, the following inequality $$C_n \propto p_0 - p' < 0 \qquad (2)$$

is the criterion about whether cavitation occurs or not. In a state where cavitation has occurred, a liquid vaporizes and generates bubbles. At that time, in case of a ship, power of the screw does not work on water, and the ship cannot run fast. This vaporization is known to occur also when intensive ultrasonic waves are used, and the present invention uses this phenomenon.

In the third aspect of the invention, the bubbles as the light scattering elements are generated by propagating ultrasonic waves from the outer circumferential surface toward the center axis of the optical fiber or optical waveguide by means of, for example, a piezoelectric element provided on the outer circumferential surface of the optical fiber or optical waveguide. When using the piezoelectric element for this purpose, the bubbles can be controlled in size by controlling the voltage applied to the piezoelectric element and thereby controlling the intensity of ultrasonic waves. The size of the bubbles can be controlled to exhibit substantially symmetrical distribution about the center axis of the optical fiber by making the piezoelectric element to encircle a large part of the circumferential surface of the optical fiber. Light introduced into the optical fiber or optical waveguide may be generated from a light source provided outside the display apparatus; however, it is typically generated from light sources provided at one-side ends of a plurality of optical fibers or optical waveguides. Although semiconductor lasers are appropriate as these light sources, light emitting diodes or super luminescent light may be used as well.

In the third aspect of the invention, light scattering elements may be fine particles. In this case, fine particles may be controlled in position by propagating ultrasonic waves from outer circumferential surfaces of optical fibers or optical waveguides toward their center axes. Alternatively, these fine particles may be controlled in position and/or orientation by introducing an optical field from optical control elements provided on outer circumferential surfaces of the optical fibers or optical waveguides into the optical fibers or optical waveguides. The use of scattered light by scattering light by means of fine particles dispersed as foreign matters (guest) in the liquid is advantageous because vibration of the fine particles (guest) and swinging movements of the liquid (host) can be controlled independently.

In the third aspect of the invention, in case of designing the photon operating device as a full-color device, the optical fibers or optical waveguides include those for red, those for green and those for blue. The optical fibers or optical waveguides for red have red emitting light sources at one-side ends thereof, the optical fibers or optical waveguides for green have green emitting light sources at one-side ends thereof, and the optical fibers or optical waveguides for blue have blue emitting light sources at one-side ends thereof. Although semiconductor lasers are appropriate as these light sources, light emitting diodes may be used as well.

In the third aspect of the invention, the optical fibers, or optical waveguides, and the control signal lines are arranged to form a curved plane as a whole, which is preferably curved normally to these optical fibers or optical waveguides and control signal lines.

In the fourth aspect of the invention, the light scattering elements are evaporated molecules of a liquid having a high vapor pressure, such as alcohol.

In the present invention, diameter of each optical fiber is determined in accordance of its desired use. Typically, however, it is in the order of mm or smaller. Also in case of using an optical waveguide, its size may be equivalent to that.

According to the fifth aspect of the invention, there is provided a photon operating method characterized in using dual signals correlated to each other, which are obtained by dividing a photon beam.

According to the invention having the above-summarized configuration, by using correlated dual signals obtained by dividing a photon beam, it is possible to perform information or arithmetic processing such as image display, recognition and/or analysis of an image, physical access from the exterior such as external pressure, detection of changes in temperature with time or space, as parallel discrete procedures. As a result, human five senses or muscular or other functions can be used more effectively.

Especially when the photon operating device is made by using optical fibers or optical waveguides, the device is simple in structure, easy to enlarge the screen, and extendible. Further, by curving the plane of the optical fibers or optical waveguides to form a desired display configuration, surface topology can be controlled easily. Further, since optical fibers or optical waveguides are thin, light and flexible, the photon operating device can be made to be thin, light and flexible. Moreover, since the light introduced into the core from one end of the optical fiber or optical waveguide is led out externally by the optical switch, the device is unlikely to produce distortion along edges of the display plane during reproduction of a large solid angle image when the screen area is large-scaled, and at the same time, it is quickly responsive.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1A:
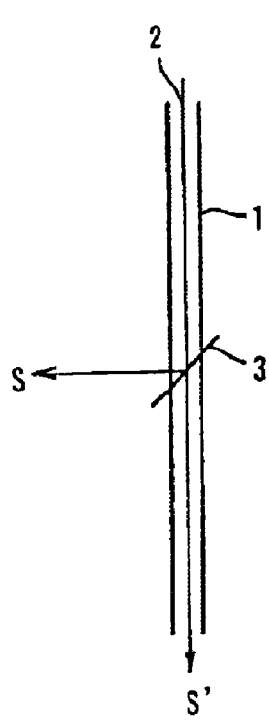
FIGS. 1A and 1B are schematic diagrams for explaining a method of creating correlated dual signals by division of a photon beam.
Figure 1B:
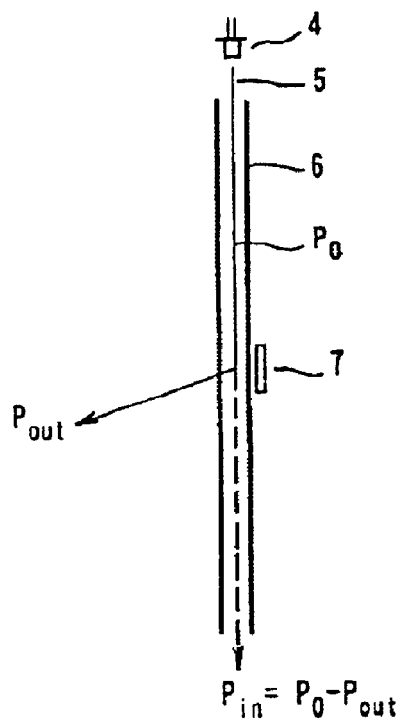
Figure 2:
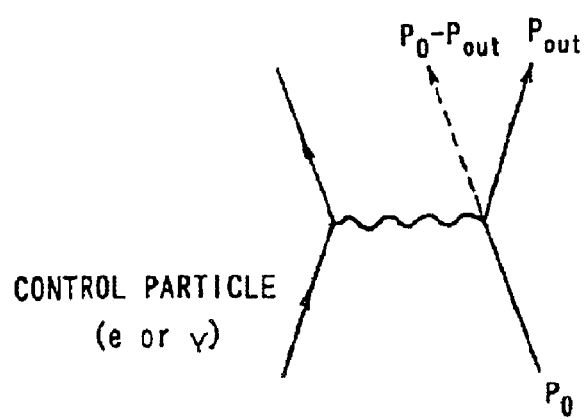
FIG. 2 is a schematic diagram that shows the concept of electromagnetic interaction of four external lines.

Prior to explaining embodiments of the invention, first made is an explanation about generation of dual signals by division of a photon beam. FIG. 1A outlines its concept. As shown in FIG. 1A, a photon beam 2 traveling through an optical waveguide element 1 is divided into correlated dual signals, namely, signal S led out outside the optical waveguide element 1 and signal S' traveling through the optical waveguide element 1. FIG. 1B more specifically shows generation of such dual signals by division of a photon beam, in which part of a laser beam 5 generated from a semiconductor laser 4 enters into an optical fiber 6, and the laser beam 5 is led out outside the optical fiber 6 by an optical switch 7 provided to the optical fiber 6 whereas the remainder remains inside the optical fiber 6. If the incident quantity of light is $P_0$, quantity of light led out outside the optical fiber 6 is $P_{out}$, and quantity of light remaining inside the optical fiber 6 is $P_{in}$, then $P_{in}=P_0-P_{out}$. When FIG. 1B is compared with FIG. 1A, $P_{out}=S$ and $P_{in}=S'$. Interaction of scattered light by the optical switch 7 is, for example, electromagnetic interaction with four external lines, as shown in a Feynman diagram of FIG. 2.

Now explained below are embodiments of the invention with reference to the drawings.

Figure 3:
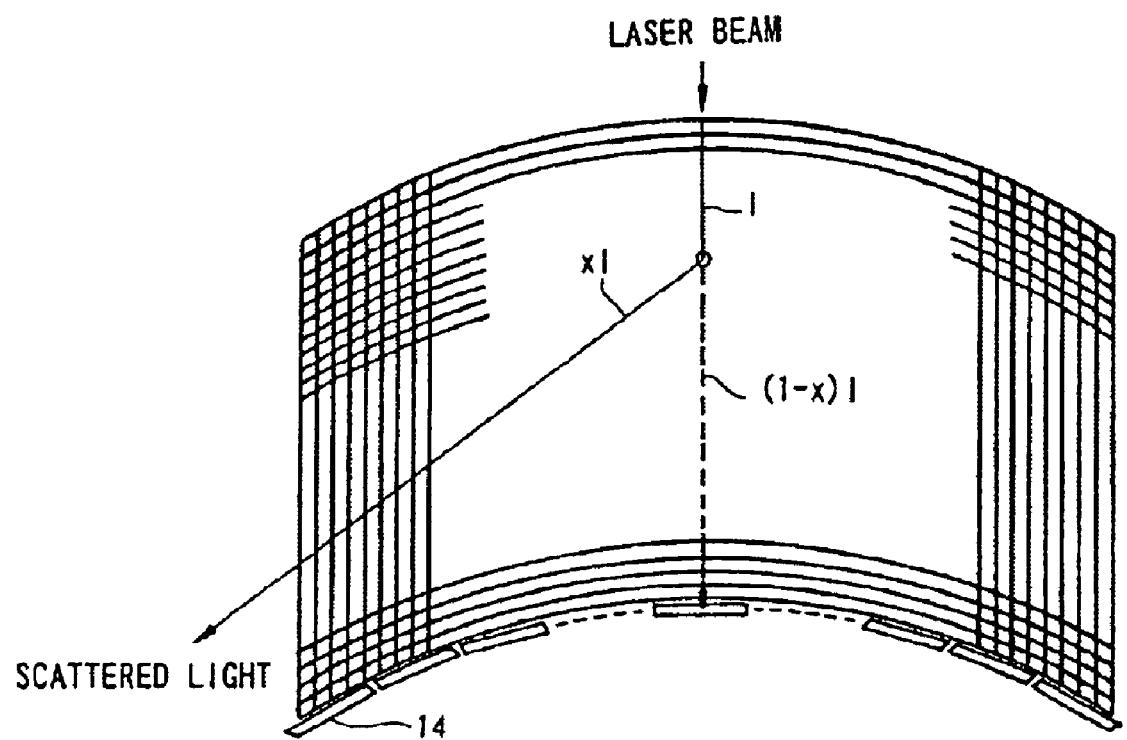
FIG. 3 is a schematic diagram that shows entire configuration of a flat color display according to the first embodiment of the invention.
Figure 4:
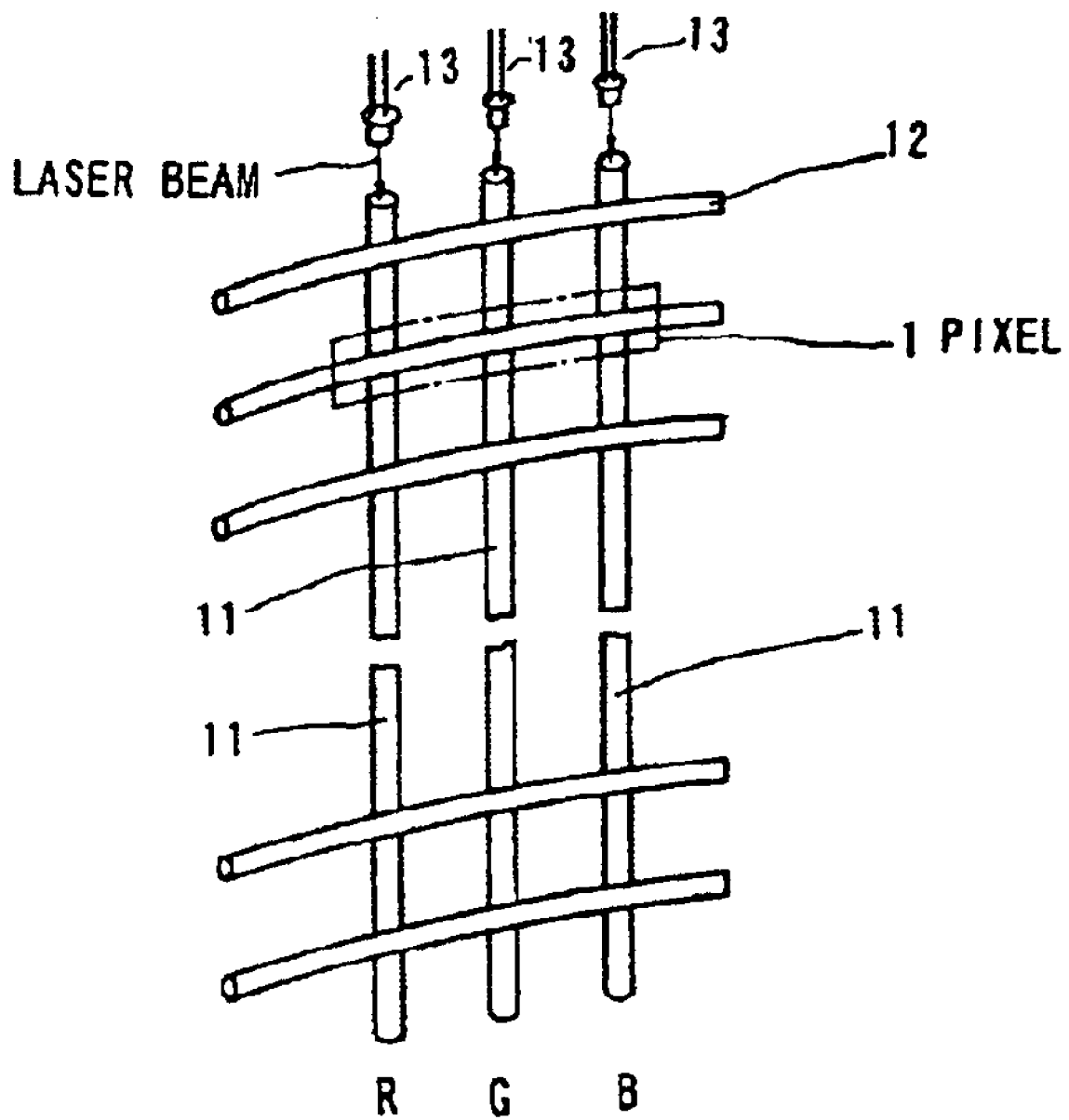
FIG. 4 is a schematic diagram that shows a part of the flat color display according to the first embodiment of the invention in an enlarged scale.

FIG. 3 shows entire configuration of a flat color display having a tactual representation function according to the first embodiment of the invention. FIG. 4 shows a part of the flat color display having the tactual representation function in an enlarged scale.

As shown in FIGS. 3 and 4, the flat color display is made up of a plurality of straight optical fibers 1 for image display aligned in parallel, and a plurality of straight optical fibers 12 aligned in parallel to each other to intersect with the optical fibers 11, thereby to form a rectangular sheet, and the entirety is curved in the lengthwise direction of the control signal lines 3 and 4 to form a concave display plane. Intersection points of these optical fibers 11 and optical fibers 12 form optical switches.

The number of optical fibers 11 depends on the number of pixels aligned in the lengthwise direction of the optical fibers 12. More specifically, three optical fibers 11 are provided per pixel for R (red), G (green) and B (blue), respectively, and 3N optical fibers 11 are provided in total (N=1, 2, 3, ...). The number of the optical fibers 12 is equal to the number of pixels aligned in the lengthwise direction of the optical fibers 11. More specifically, for example, in case the flat color display is for HDTV, 1000 pixels in the direction of the optical fiber 11 (vertical direction) and 1000 pixels in the direction of the optical fiber 12 (horizontal direction) are required, and hence, 3000 optical fibers 11 and 1000 optical fibers 12 are required. Display rate of the screen is 60 frames per 60 seconds (16 ms per frame).

At one-side ends of the R, G and B optical fibers 11 (upper ends in FIGS. 3 and 4), semiconductor lasers 13 are provided as light sources such that laser beams can be introduced from these semiconductor lasers 13 into cores from the end surfaces of the optical fibers 11. Used as the semiconductor lasers 13 for R, G and B optical fibers 11 are those for red light emission, green light emission and blue light emission, respectively. More specifically, AlGaInP compound semiconductor lasers may be used as the semiconductor lasers 13 for red light emission, ZnSe compound semiconductor lasers may be used as the semiconductor lasers 13 for green light emission, and GaN compound semiconductor lasers may be used as the semiconductor laser 13 for blue light emission. Also at one-side ends of the optical fibers 12, there are provided semiconductor lasers (not shown) as light sources, and laser beams from these semiconductor lasers can be introduced into cores of the optical fibers 12 from their end surfaces. These laser beams are used as control light for optical switches. Used as the semiconductor lasers are those corresponding to the wavelength of light to be used as the control light.

At the other ends of the R, G and B optical fibers 11 (lower ends in FIGS. 3 and 4), CCD line sensors 14 (FIG. 3), for example, are provided as photo detectors such that each is shared by a plurality number of pixels aligned in the lengthwise direction of the optical fibers 12 to detect laser beams emitted from the other ends of these optical fibers 11. In association with each CCD line sensor 14, a shift register (not shown) is provided. Thus, signals by each horizontal scan of the optical fibers 12 are input as laser beams into the CCD line sensors 14, and the input pieces of information are sequentially stored in the shift registers to store information of one screen (one frame). It should be noted here that the light emitted from the other ends of the optical fibers 11 and entering into the CCD line sensors 14 have a complementary relation with the light extracted as the light for display. That is, when I represents the quantity of incident light from one end of an optical fiber 11 and a ratio x is externally led out by scattering, the quantity of scattered light is xI, and the quantity of emitted light from the other end of the optical fiber 11 is (1−x)I. Therefore, image information stored in the shift register is in a complementary relation with the image information displayed. In other words, image information displayed and image information stored in the shift register have a relation similar to positive-and-negative. Alternatively, image information stored in the shift register can be also expressed as inversion information of the image information to be displayed.

The semiconductor laser 13 at one end of each optical fiber 11 and the semiconductor laser at one end of each optical fiber 12 can be driven in response to image signals by a horizontal drive circuit and a vertical drive circuit, both not shown. In this case, synchronously with scanning the optical fibers 12 downward from the top, inversion signal of the image signal enters into CCD line sensors 14, and it is stored as information in a shift register finally connected to the CCD line sensor 14.

Figure 5:
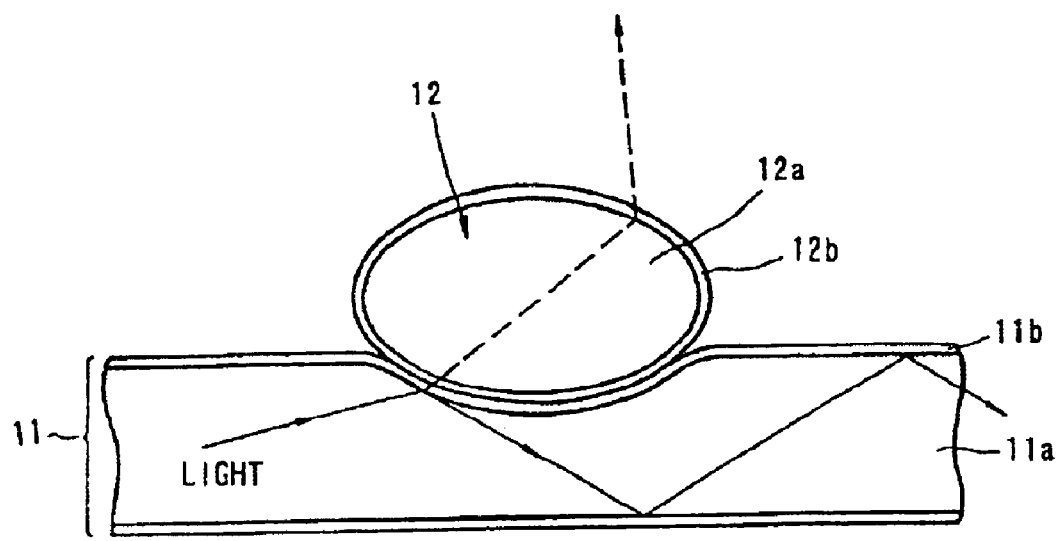
FIG. 5 is a cross-sectional view of an intersection point of optical fibers in the flat color display according to the first embodiment of the invention.
Figure 6:
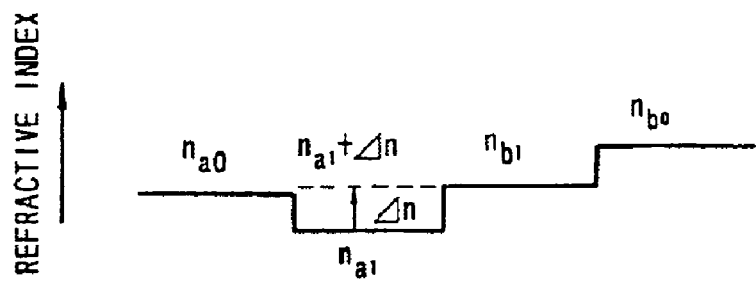
FIG. 6 is a schematic diagram for explaining operation of the flat color display according to the first embodiment of the invention.

FIG. 5 shows structure of an intersection between an optical fiber 11 and an optical fiber 12. Used as the optical fiber 12 is, for example, an infrared optical fiber. At the intersection of the optical fibers 11, 12, the optical fiber 11 has a local recess in its upper portion, and the optical fiber 12 is coupled to the recess. The optical fiber 11 includes a core 11a having a refractive index $n_{a0}$ and a cladding 11b having a refractive index $n_{a1}$. In the cladding 11b, metal fine particles, for example, are dispersed. The optical fiber 12 includes a core 12a having a refractive index $n_{b0}$ and a cladding 12b having a refractive index $n_{b1}$. A profile of refractive indices at each intersection of these optical fibers 11, 12 is shown in FIG. 6.

In the flat color display, light (main light) is previously guided in an optical fiber 11 selected in response to an image signal to be displayed as shown by the solid line in FIG. 5. Under this condition, once the light such as ultraviolet light is introduced as control light into the optical fiber 12, evanescent light (massive photon) is generated in the cladding 11b of the optical fiber 11 at the contact with the optical fiber 12, and the evanescent light functions to generate plasma near metal fine particles dispersed in the cladding 11b and thereby produce a change of refractive index Δn. The evanescent light has an intensity profile expressed by $e^{-ax}$ (a is the absorption coefficient and x is the penetration depth of light). If the metal fine particles are Au fine particles, Δn>0 for red light and blue light whereas Δn<0 for green light. In case the metal fin particles are Cu fine particles, Δn<0 for red light whereas Δn>0 for green light. In case of Δn>0, in particular, when refractive index of the cladding 11b is larger than or approximately equal to the refractive index $n_{a0}$ of the core 11a, total reflection does not establish in recesses of the optical fibers 11. As a result, as shown by the broken line in FIG. 5, light exits the optical fiber 11 and enters into the optical fiber 12, and finally exits the optical fiber 12. In this case, the optical fiber 12 behaves as a lens for incident light from the optical fiber 11.

With the foregoing matter as a premise, a method of operating the flat color display will be explained. That is, in response to an image signal, an optical fiber 11 and an optical fiber 12 for R, G and B are selected. By driving a semiconductor laser 13 at one end of the selected optical fiber 11 to introduce laser light from the semiconductor laser 13 to the core 11a of the optical fiber 11, and at the same time, control light is introduced into the selected optical fiber 12 to switch light at the intersection between the optical fiber 12 and the optical fiber 11. As a result, red, green and blue laser beams introduced into each optical fiber 11 are scattered, respectively, such that scattered beams of light are led out ahead the display plane. Thus a desired color image is displayed.

On the other hand, signals by each horizontal scan of the optical fibers 12 are input as laser light to each CCD line sensor 14, and the input pieces of information are sequentially accumulated in the shift register to sequentially store one-frame information.

This flat color display is capable of various kinds of information processing shown below in addition to representation of an image as explained above.

That is, by extracting a time difference of stored information for each frame, information about movements and information about periodic movements can be obtained. That is, it is known that a position with no difference is a still point whereas a position with a large difference is a portion moving at a high speed.

Additionally, by taking spatial difference of stored information for each frame, information about contours, surface unevenness or roughness can be obtained. That is, it can be known that a portion where the difference is 0 is a smooth plane, and a portion where the difference is large represents a line, domain, edge or uneven surface.

Further by obtaining color difference of stored information for each frame, information about changes in temperature or temperature domain, or information about changes in quantity of light (changes in sunlight) can be obtained. That is, as changes in RGB components of each pixel, if the R component decreases with an increase of the B component, it is known that the temperature has risen. In a portion where the difference is zero, the temperature is constant. Color difference can be taken in terms of space and time, two kinds of information, i.e. temperature change with time and spatial temperature change, can be obtained.

In this manner, the flat color display is not limited to a mere display, but can have various functions when used as environment monitors for various kinds of information such as movements of objects, ups and downs, temperature changes, and so forth.

Further, the flat color display can automatically correct time drifts produced in the flat color display itself, by previously storing image information stored in shift registers in ROM, for example, and executing comparison with the image information stored in ROM.

Furthermore, with the flat color display, since one-frame information is stored in shift registers through CCD line sensors 14, unlike VTR using a magnetic head or optical disc apparatuses using optical pickup, it is possible to realize a complete stop motion and display a still image without mechanical motions.

Figure 7A:
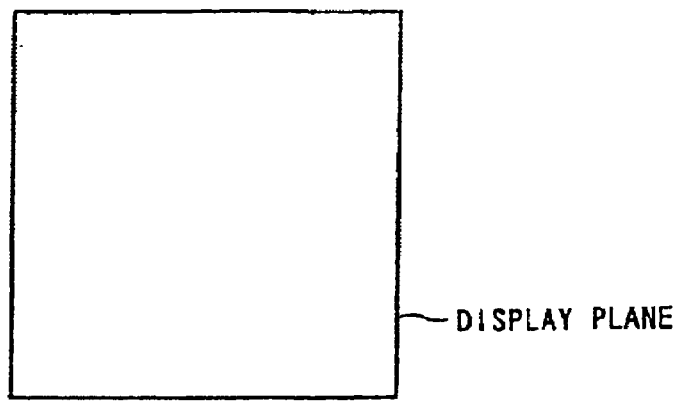
FIGS. 7A through 7C are schematic diagrams for explaining operation of the flat color display according to the first embodiment of the invention.
Figure 7B:
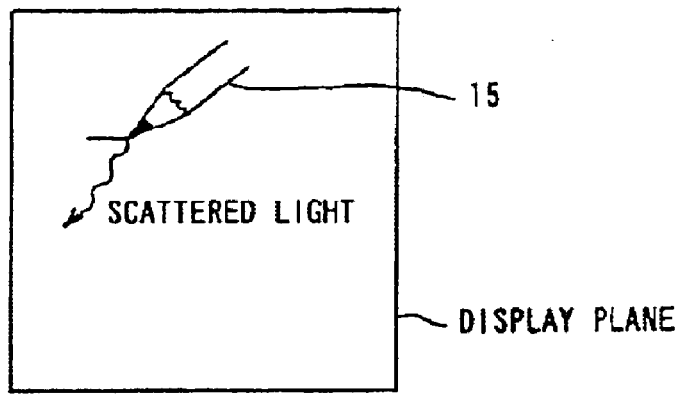
Figure 7C:
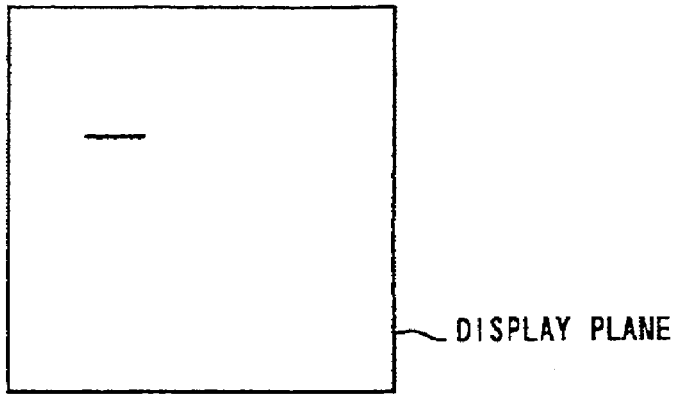

The flat color display can be also used as a pressure sensor or a touch sensor. That is, if a pressure is locally applied onto the screen of the flat color display, optical fibers 11 are partly curved in the area applied with the pressure, and cause laser beams transmitted in the optical fibers 11 to change in guide mode from 0-order mode to a high-order mode, inviting an increase of quantity of light led out exteriorly, and causing a decrease of quantity of light incident to CCD line sensors 14. Therefore, by detecting this change, the fact that a pressure has been applied and the region where the pressure has been applied can be detected. More specifically, assuming that the initial screen shown in FIG. 7A has been traced straight with the tip of a pencil 15 as shown in FIG. 7B, the pressure applied from the tip of the pencil 15 causes light to scatter along the trace, and as a result, causes a decrease in quantity of incident light. Then, if a difference is taken between the inversion information of the image information of FIG. 7B and the inversion information of the initial image information shown in FIG. 7A, the trace of the tip of the pencil 15 can be detected. Since the flat color display as this pressure sensor or touch sensor is made by weaving flexible optical fibers 11, 12, it can be used as an input device similar to paper.

Figure 8:
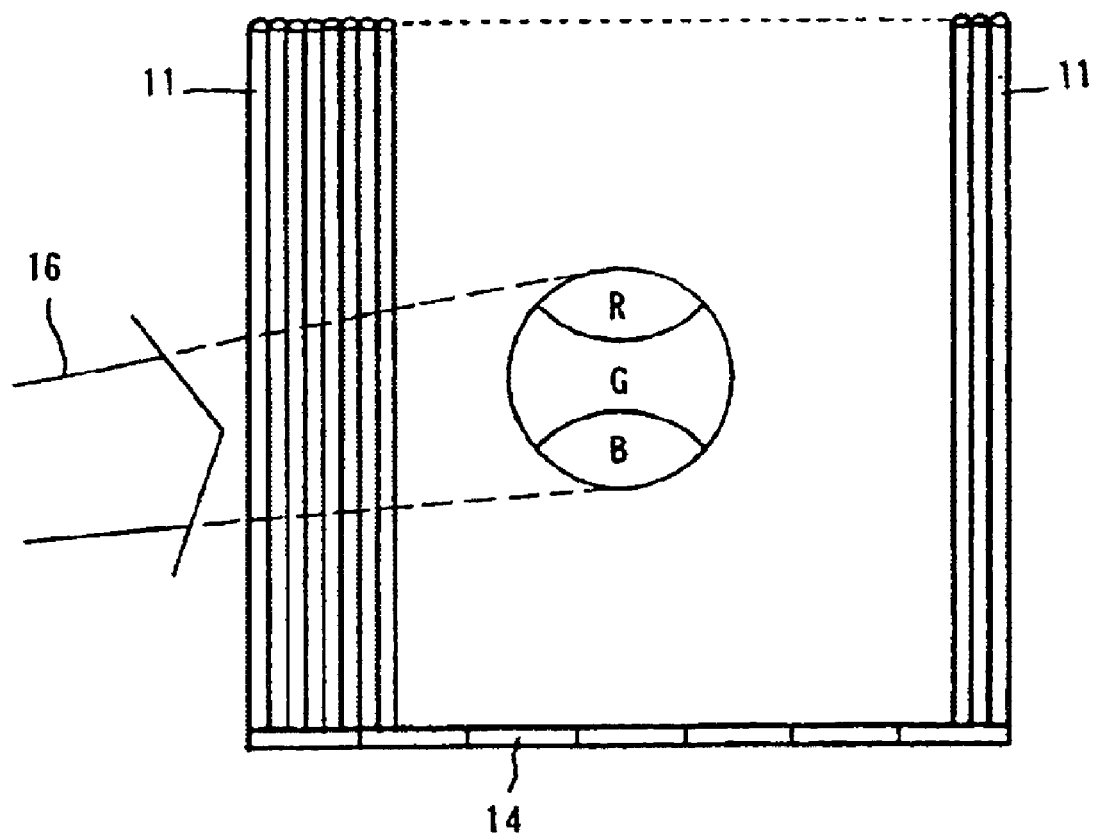
FIG. 8 is a schematic diagram for explaining operation of the flat color display according to the first embodiment of the invention.

The flat color display can be used also as a kind of image receiver. That is, as shown in FIG. 8, by irradiating the display plane of the flat color display with a sufficiently intensive external image light 16, there occur a change in the original light lead-out efficiency of the flat color display, and hence in quantity of light incident to CCD line sensors 14 (negative signal intensity) in response to the irradiation of the image light 16. As a result, by detecting optical signals input to CCD line sensors 14 before and after application of external image light 16, image information of the image light 16 or its inversion information can be introduced. By inputting signals to CCD line sensors 14 in line sequence, image information can be finally stored as two-dimensional image. The flat color display can be operative in an operation mode for merely receiving light without leading out light to the exterior of the display plane.

Reproduction of image information by the image light 16 is explained in greater detail. Assume here that intensities of RGB components of the image light 16 are $I_R$, $I_G$ and $I_B$. Under the white mode as the camera mode and all of RGB being turned ON, their changes are detected with CCD line sensors 14. At that time, intensities of RGB components of the image light 16 and intensities input to CCD line sensors 14 represent the relations shown in the following table. In the table, R, G and B represent input intensities to CCD line sensors 14, respectively. It is known from this table that $I_R$, $I_G$ and $I_B$ can be reproduced by correlation of respective components of a 3×3 matrix.

|  | R | G | B |
| --- | --- | --- | --- |
| $I_R$ | $\partial R/\partial I_R$ | $\partial G/\partial I_R$ | $\partial B/\partial I_R$ |
| $I_G$ | $\partial R/\partial I_G$ | $\partial G/\partial I_G$ | $\partial B/\partial I_G$ |
| $I_B$ | $\partial R/\partial I_B$ | $\partial G/\partial I_B$ | $\partial B/\partial I_B$ |

As explained above, according to the first embodiment, since the flat color display is composed of optical fibers 11, 12 arrange vertically and horizontally, a multi-function flat color display, which is flexible, thin, light and inexpensive, can be obtained. That is, the flat color display can perform various functions as an intelligent environment monitor, pressure sensor or touch sensor concerning acknowledgement of an image, movements of an object, changes in temperature, and so on, in addition to representation of an image, such that human five senses can be effectively used and the function as UI connecting humans and exteriority can be remarkably enhanced. Additionally, by increasing the length and/or number of optical fibers 11, 12, a large-scale screen of the 100-inch class, for example, can be readily obtained. Furthermore, a high-fidelity color display can be obtained by sufficiently decreasing intervals of optical fibers 11, 12. Additionally, since the optical switches only take a very short time for switching, high-speed operation is possible. Moreover, the display can be curved very easily in the horizontal direction, which is the alignment direction of human eyes, and can represent a large-scaled three-dimensional image without distortion.

Next explained is a flat color display according to the second embodiment of the invention.

Figure 9:
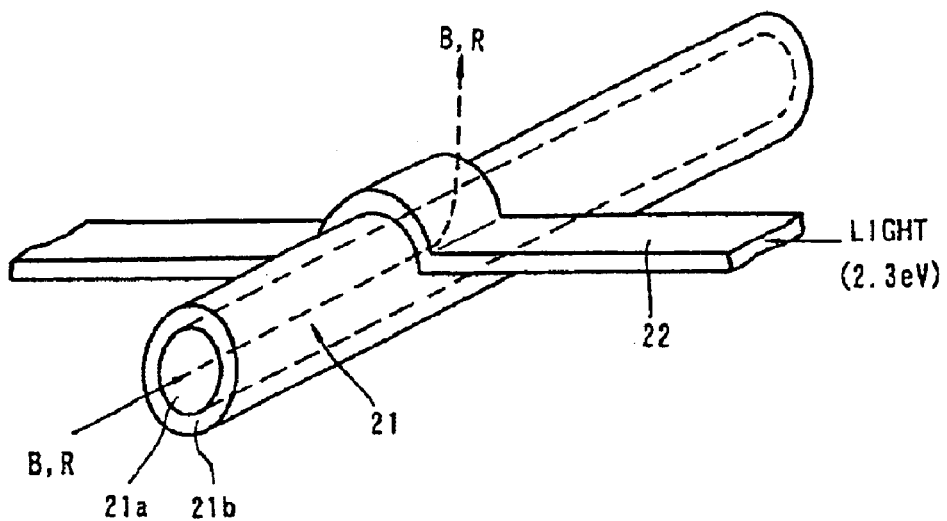
FIG. 9 is a schematic diagram for explaining a flat color display according to the second embodiment of the invention.

As shown in FIG. 9, the second embodiment uses optical fibers 21 and optical waveguides 22 instead of optical fibers 11, 12 of the first embodiment. In the other respects, the second embodiment is the same as the first embodiment.

As shown in FIG. 9, linear optical waveguides 22 are provided to intersect and contact with optical fibers 21 made up of cores 21a and claddings 21b. In selective portions of claddings 21b at intersections with the optical fibers 21 and the optical waveguides 22, Au fine particles are dispersed.

Figure 10:
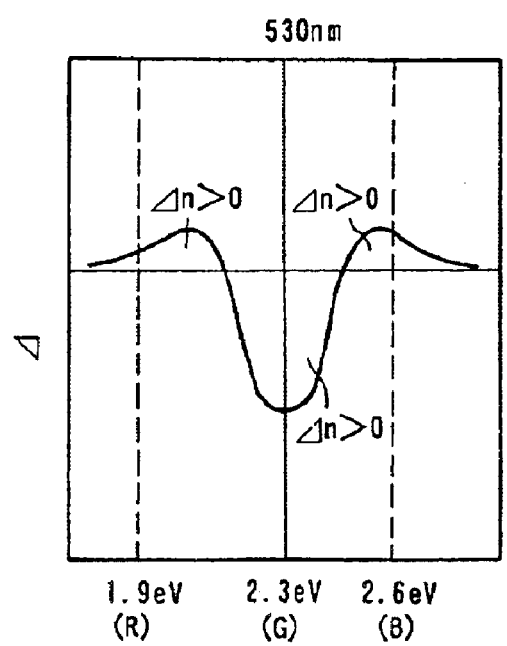
FIG. 10 is a schematic diagram for explaining operation of the flat color display according to the second embodiment of the invention.

In the flat color display, light is introduced from one end of each optical fiber 21. More specifically, blue light or red light is introduced. Under the condition, when green light with the wavelength of 530 nm (2.3 eV in photon energy) is introduced as control light into an optical waveguide 22, evanescent light is generated in the cladding 21b of a portion of the optical fiber 21 in contact with the optical waveguide 22, and the evanescent light functions to generate plasma on surfaces of Au fine particles dispersed in the cladding 21b and thereby produce a change of refractive index Δn of the cladding 21b. In this case, Δn>0 for red light and blue light whereas Δn<0 for green light. This aspect is shown in FIG. 10 (in the figure, Δ on the ordinate represents relative change in refractive index). Due to this Δn, when the refractive index of the cladding 21b is larger or approximately equal to the refractive index of the core 21a, total reflection does not establish in portions near contacts with the optical waveguides 22. As a result, as shown by the broken line in FIG. 9, light exits the optical fiber 21, then travels through the optical waveguide 22 and finally exits the optical waveguide 22.

Figure 11:
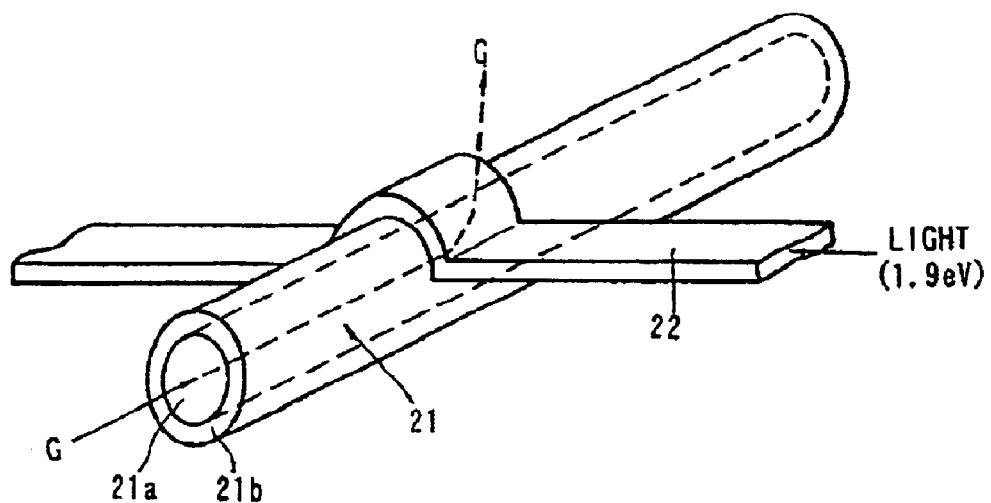
FIG. 11 is a schematic diagram for explaining the flat color display according to the second embodiment of the invention.
Figure 12:
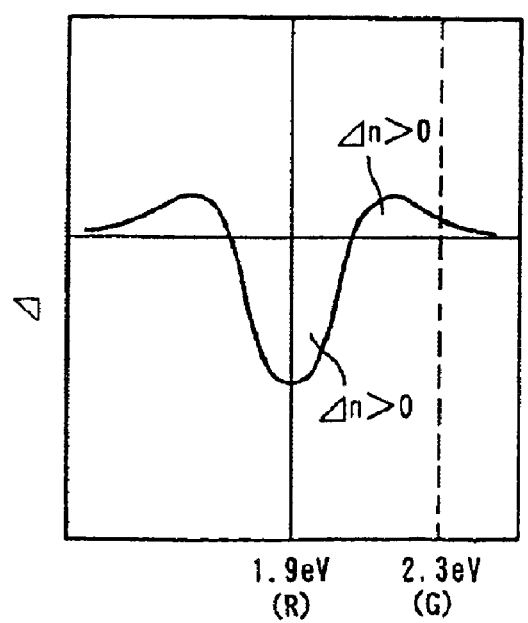
FIG. 12 is a schematic diagram for explaining operation of the flat color display according to the second embodiment of the invention.

FIG. 11 shows an aspect of green light introduced into the optical fiber 21. When red light with the photon energy of 1.9 eV is introduced as control light into an optical waveguide 22, evanescent light is here again generated in the cladding 21b of a portion of the optical fiber 21 in contact with the optical waveguide 22, and the evanescent light functions to produce a change of refractive index Δn of the cladding 21b. In this case, Δn>0 for green light. This aspect is shown in FIG. 12. Due to this Δn, when the refractive index of the cladding 21b is larger or approximately equal to the refractive index of the core 21a, total reflection does not establish in portions near contacts with the optical waveguides 22. As a result, as shown by the broken line in FIG. 11, light exits the optical fiber 21, then travels through the optical waveguide 22 and finally exits the optical waveguide 22.

With the second embodiment, the same advantages as those of the first embodiment can be obtained.

Next explained is a flat color display according to the third embodiment.

Figure 13:
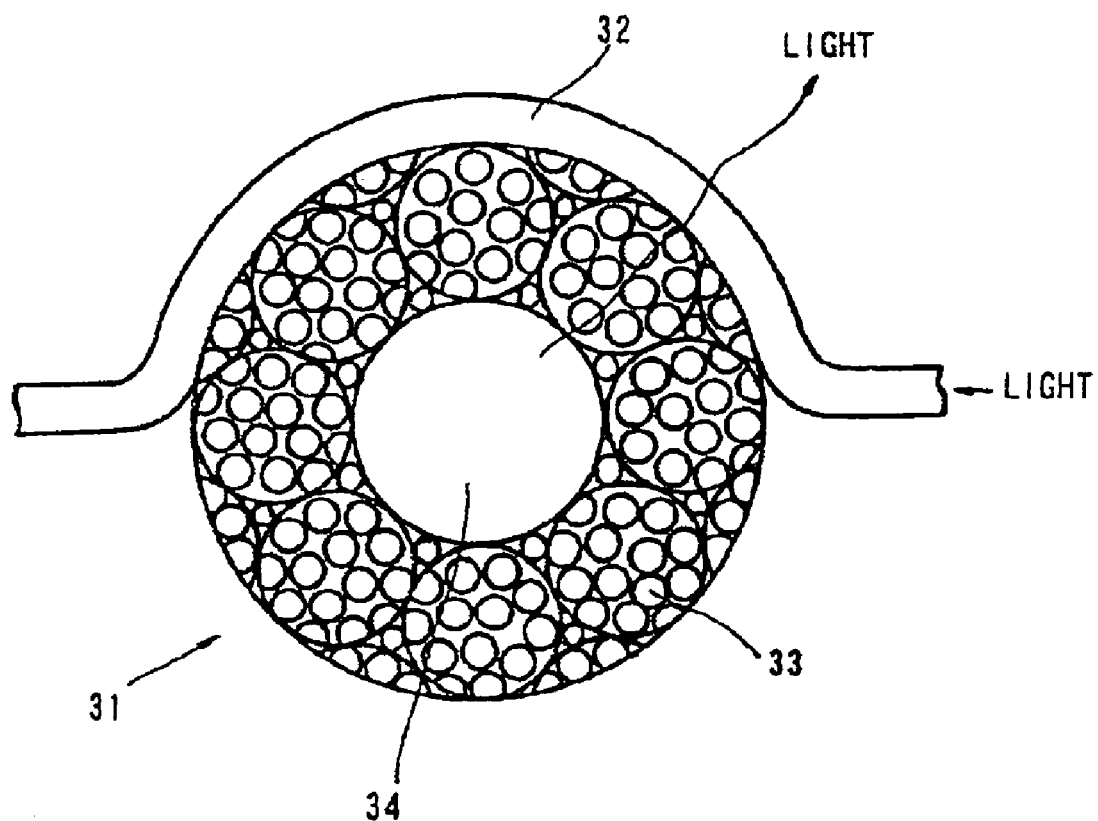
FIG. 13 is a cross-sectional view for explaining a flat color display according to the third embodiment of the invention.

As shown in FIG. 13, the third embodiment uses optical fibers 31 and optical waveguides 32 instead of optical fibers 11, 12 of the first embodiment. In the other respects, the third embodiment is the same as the first embodiment.

As shown in FIG. 13, each optical fiber 31 is made by making a two-dimensional array of a plurality of elongated rod-shaped photonic crystal 33 bound together, and arranging a plurality of such two-dimensional arrays around a core 34 to form a cladding. Each optical waveguide 32 is provided to intersect and contact with the optical fibers 31.

In the flat color display, light is introduced from one end of each optical fiber 31. Under the condition, when light is introduced as control light into an optical waveguide 32, the light penetrates into the photonic crystals 33 forming the cladding of the optical fiber 31 at the contact with the optical waveguide 32 and changes the photonic band gap such that total reflection does not establish at the boundary between the core 34 and the cladding of the photonic crystals 33. As a result, light exits the optical fiber 31, then travels through the optical waveguide 32 and finally exits the optical waveguide 32.

Especially when the photonic band gap is used, light can get out from conditions for total reflection upon the gap being offset upward or downward relative to the refractive index of the core 34. That is, more various mechanisms are usable as optical switching mechanism. For example, $\Delta n>0$ may be employed as shown in examples of FIGS. 5, 6, 9 and 11, but $\Delta n<0$ is also employable. In addition to those, any mechanism generally giving $\Delta n<0$ may be used. Changes of $\Delta n<0$ by optically induced carriers is one of such examples.

With the third embodiment, the same advantages as those of the first embodiment can be obtained.

Next explained is a flat color display according to the fourth embodiment of the invention.

Figure 14A:
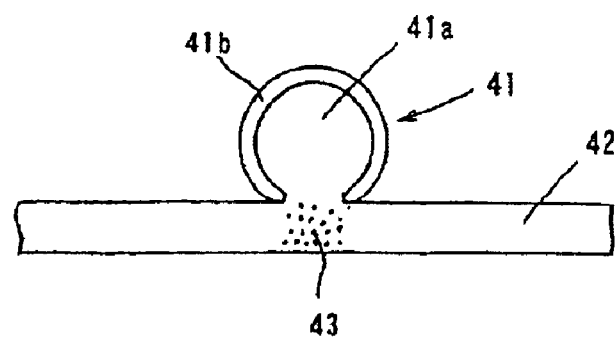
FIGS. 14A and 14B are cross-sectional views for explaining a flat color display according to the fourth embodiment of the invention.

As shown in FIG. 14, the fourth embodiment uses optical fibers 41 and optical waveguides 42 instead of optical fibers 11, 12 of the first embodiment. In the other respects, the fourth embodiment is the same as the first embodiment.

As shown in FIG. 14, in the flat color display, optical waveguides 42 are provided to intersect with optical fibers 41 each made up of a core 41 and a cladding 41b. In selective portions of the optical fibers 41 located at intersections with the optical waveguides 42, the cladding 41b does not exists, and the optical waveguides 42 are directly coupled to the cores 41a. In the coupled portions of the optical waveguides 42, three-dimensional or two-dimensional photonic crystals 43 are dispersed.

Figure 14B:
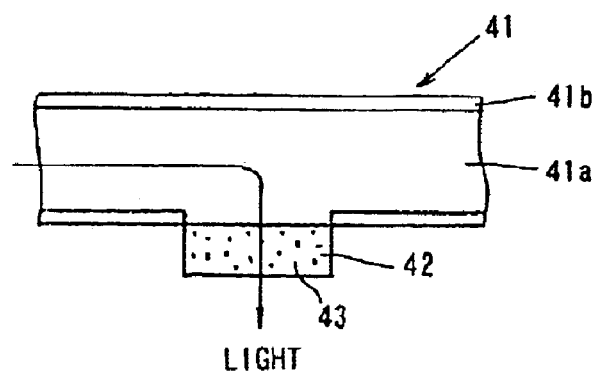

In the flat color display, light is introduced from one end of each optical fiber 41. When control light is not introduced into the optical waveguide 42, refractive index of the core 41a of the optical fiber 41 remains in the photonic band gap of the photonic crystals 43 near around, and conditions for total reflection in the optical fiber 41 are satisfied. Therefore, light propagates in the optical fiber 41 without loss. When control light is introduced into the optical waveguide 42, the photonic band gap of the photonic crystals 43 deviate such that the refractive index of the core 41a can couple to the guide mode of the photonic crystals 43, and total reflection does not establish in portions of the optical fiber 41 near junctions with the optical waveguide 42. As a result, light exits the optical fiber 41 (FIG. 14B).

With the fourth embodiment, the same advantages as those of the first embodiment can be obtained.

Next explained is a flat color display according to the fifth embodiment of the invention.

Figure 15:
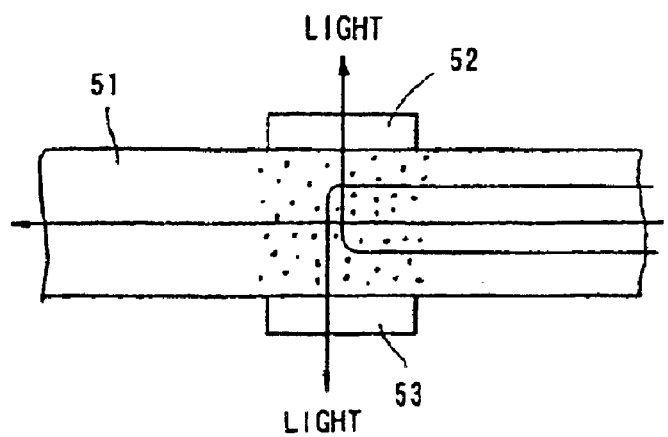
FIG. 15 is a cross-sectional view for explaining a flat color display according to the fifth embodiment of the invention.

As shown in FIG. 15, the fifth embodiment uses optical fibers 51 and optical waveguides 52, 53 instead of optical fibers 11, 12 of the first embodiment. In the other respects, the fourth embodiment is the same as the first embodiment.

As shown in FIG. 15, in the flat color display, optical waveguides 52, 53 are provided to overlie, underlie and intersect with optical fibers 51 each made of $SnO_2$, or multi-component glass such as one of a group of tellurites or fluorides, which matches in refractive index with ITO, for example. These optical waveguides 52, 53 are made of multi-component glass often used as optical waveguides of ultraviolet light. Width of each optical waveguide 52, 53 is about 1 mm, for example. In selective portions of the optical fibers 51 intersecting the optical waveguides 52, 53, fine particles 54 of $SnO_2$ or ITO, for example, are dispersed.

In the flat color display, light is introduced from one end of each optical fiber 51. When control light is not introduced into either of the optical waveguide 52, 53, conditions for total transmission in the optical fiber 51 are satisfied, and the light propagates in the optical fiber 51. When ultraviolet light is next introduced as control light into the optical waveguide 52, for example, carriers are generated by optical excitation at portions of fine particles 54 of $SnO_2$ or ITO dispersed in the optical waveguide 52, and a change in refractive index $\Delta n<0$ is produced in the fine particles 54. This $\Delta n$ is approximately $10^{-3}$, for example. Therefore, fine scattered matters different in refractive index appear, conditions for total transmission does establish in the optical fiber 51, and light exits the optical fiber 51 upward in FIG. 15. Also in case such ultraviolet light is introduced as control light into the optical waveguide 53, light exits the optical fiber 51 in the same manner and theory.

It is noticeable here that, even if the optical fiber 51 and the fine particles 54 are equal in refractive index, since they are different in band gap, light having a photon energy of an intermediate value of those band gap energies changes the refractive index of one of them having a smaller band gap, and thereby produces a difference in refractive index.

With the fifth embodiment, the same advantages as those of the first embodiment can be obtained.

Next explained is a flat color display according to the sixth embodiment of the invention.

Figure 16:
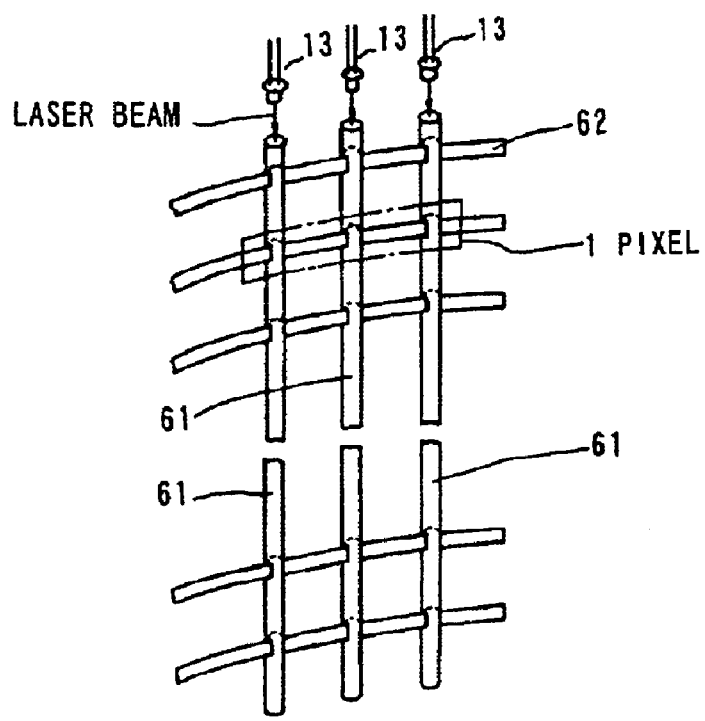
FIG. 16 is a schematic diagram for explaining the flat color display according to the sixth embodiment of the invention.

As shown in FIG. 16, the fifth embodiment uses optical fibers 61 with liquid cores and control signal lines 62, respectively, instead of optical fibers 11, 12 of the first embodiment.

Figure 17:
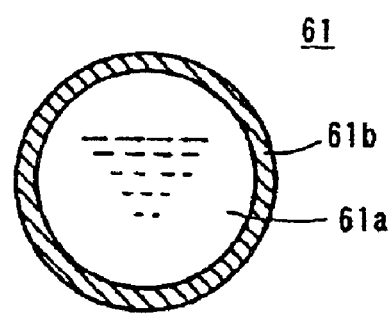
FIG. 17 is a cross-sectional view of an optical fiber forming the flat color display according to the sixth embodiment of the invention.

FIG. 17 shows a cross-sectional structure of the optical fiber 61. As shown in FIG. 17, the optical fiber 61 is made up of a liquid core 61a, and a solid cladding 61b around the core 61a. The liquid forming the core 61a is selected depending on the intended use. For example, water and ethyl alcohol with ultra fine oxide particles dispersed therein in accordance with the refractive index of the cladding 61a, for example, are suitable materials. As the material of the cladding 61b, plastics or glass, typically used as materials of optical fibers, may be used. The optical fiber 61 can be made by preparing a thick plastic preform confining a liquid in a central portion and then expanding it, or by introducing a liquid into the cavity of a hollow optical fiber, for example.

Figure 18:
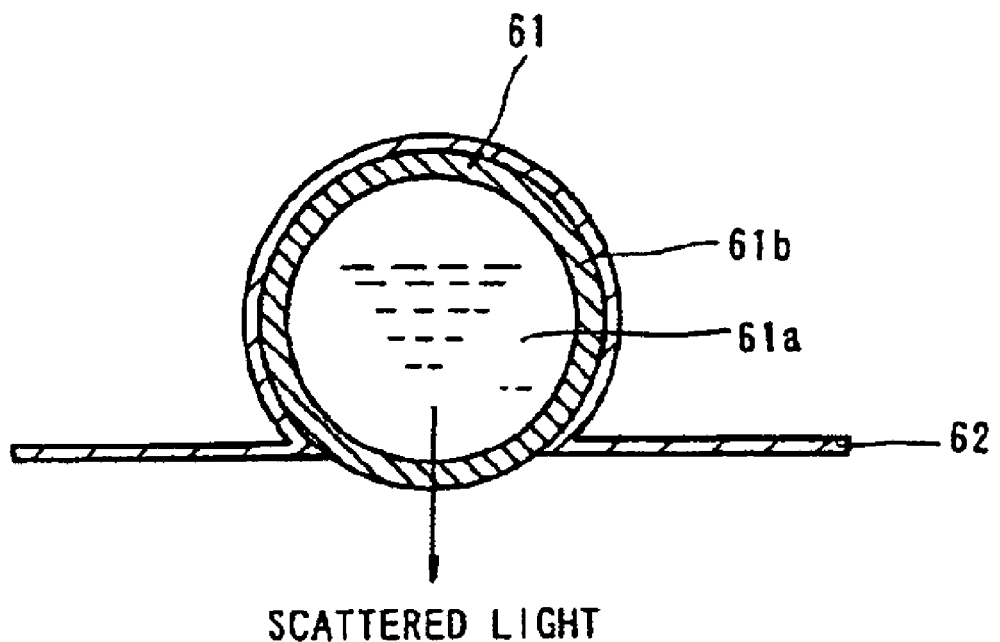
FIG. 18 is a cross-sectional view of an intersection point of an optical fiber and a control signal line in the flat color display according to the sixth embodiment of the invention.
Figure 19:
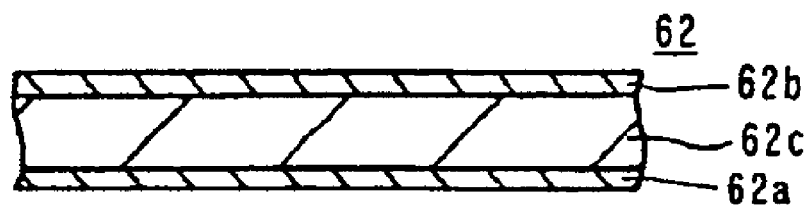
FIG. 19 is a cross-sectional view that shows structure of the control signal line forming the flat color display according to the sixth embodiment of the invention.

FIG. 18 is a cross-sectional view of an intersection point of an optical fiber 61 and a control signal line 62. As shown in FIG. 18, at each intersection point between the control signal line 62 and the optical fiber 61, the control signal line 62 defines a concave surface in contact with the outer circumferential surface of the optical fiber 61 excluding a part of the circumference facing the display plane of the display. As shown in FIG. 19, the control signal line 62 has a piezoelectric element structure in which a piezoelectric material 62c is sandwiched by a pair of metal electrodes 62a and 62b, and the lower metal electrode 62a is in contact with the outer circumferential surface of the optical fiber 61. In this case, the surface of the control signal line 62 made of the piezoelectric element in contact with the cladding 61b is the surface of the metal electrode 62a, which has a high reflectance. Therefore, light scattered in the core 61a is efficiently led out externally from the portion not covered by the control signal line 62. As a method of applying a voltage to the piezoelectric element, there is the method of grounding one of the metal electrodes 62a, 62b and applying a positive voltage to the other, for example. Usable as the piezoelectric material 62c of the piezoelectric element are, for example, polycrystalline or ceramic materials like $PbTiO_3$, PZT, PLZT, ZnO, and polymers like polyvinylidene fluoride (PVDF). There are some methods usable for making the control signal line 62 in form of the piezoelectric element, such as the method usable when using a polycrystalline or ceramic material as the piezoelectric material 62c and configured to first arrange optical fibers 61 in parallel and then sequentially stack a metal, piezoelectric material and metal through an appropriate mask by sputtering, vacuum evaporation, screen printing, or the like, and the method usable when using PVDF as the piezoelectric material 62c and configured to first prepare a multi-layered film stacking metal films on opposite surfaces of a PVDF film and then bond stripe-shaped cutout pieces thereof onto outer circumferential surfaces of the optical fibers 61.

Diameter of each optical fiber 61 is 200 through 300 $\mu$m, for example, and width of the control signal line 62, i.e. the width of the piezoelectric element (corresponding to the length of each pixel in the lengthwise direction of the optical fiber 61), is about 1 mm, for example. In order to bring about effective light scattering in the lengthwise direction of the optical fiber 61, since length L of the bubble generating region in the core 61a in the lengthwise direction of the optical fiber 61 may be only ~$\mu$m, the width around 1 mm is a sufficiently large value as the width of the piezoelectric element.

In the sixth embodiment, ultrasonic waves are generated using the piezoelectric elements forming the control signal lines 62 in contact with outer circumferential surfaces of the optical fibers 61 as an oscillator so as to induce cavitation and generate bubbles in the liquid cores 61a due to the ultrasonic waves. These procedures will be explained below more specifically.

Figure 20:
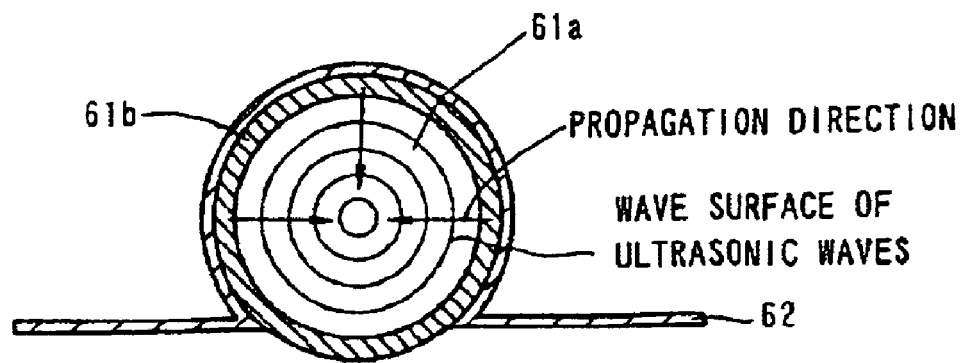
FIG. 20 is a cross-sectional view that shows an aspect of propagation of ultrasonic waves to an optical fiber in the flat color display according to the sixth embodiment of the invention.

FIG. 20 shows an aspect inside the optical fiber 61 in which ultrasonic waves are generated by using the control signal line 62 of the piezoelectric element as an oscillator. As shown in FIG. 20, ultrasonic waves radiated due to oscillation of the piezoelectric element and propagating through the optical fiber 61 gradually constrict as going closer the center axis of the optical fiber 61 because the contact surface of the piezoelectric element with the optical fiber 61 is a concave plane. At that time, representing the intensity of the sonic waves at the position distant by r from the center axis of the optical fiber 61 by I(r) [W/m$^2$], it can be expressed as:

$$I(r) = I_{rim} \cdot 2\pi R_0 L / 2\pi r L = (R_0/r) I_{rim} \quad (3)$$

where $I_{rim}$ is the intensity [W/m$^2$] of the sonic waves on the outermost circumferential surface of the optical fiber 61, $R_0$ is the outer diameter of the optical fiber 1, L is the length of the control signal line 62, i.e. the piezoelectric element, in the axial direction of the optical fiber 61, which is equal to the length of each pixel in the lengthwise direction of the optical fiber 61.

Figure 21:
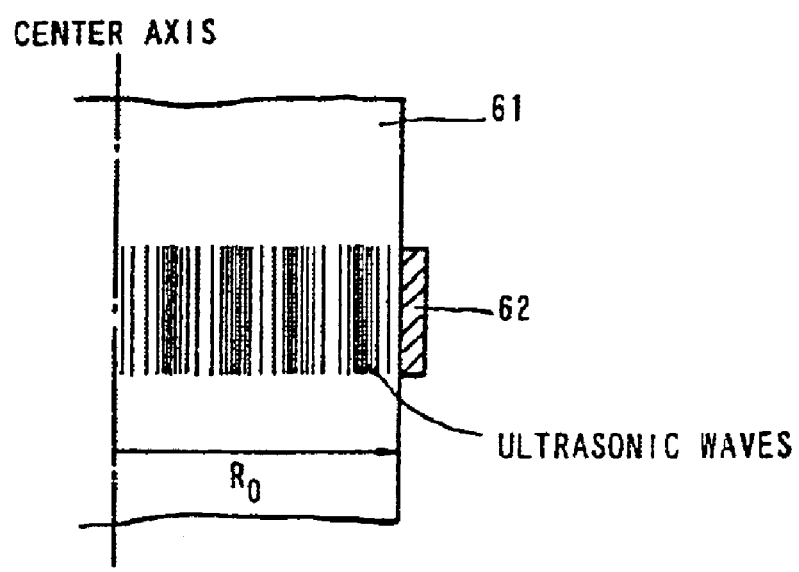
FIG. 21 is a cross-sectional view that shows an aspect of propagation of ultrasonic waves to an optical fiber in the flat color display according to the sixth embodiment of the invention.

FIG. 21 shows an aspect of propagation of ultrasonic waves in a lengthwise cross-sectional view (longitudinally sectional view) of the optical fiber 61. Since ultrasonic waves are longitudinal waves, uneven waves normal to the center axis of the optical fiber are generated as shown in FIG. 21, and the sonic intensity I [W/m$^2$] relative to the sound pressure P [N/m$^2$] is given by:

$$I = P^2 / \rho C_s \quad (4)$$

where $\rho$ is the liquid density, and $C_s$ is the sonic velocity. Assuming that the intensity I of the sonic waves generated by the piezoelectric element is an independent variable, then the sound pressure $P_{rim}$ on the outer circumferential surface of the optical fiber 61 is:

$$P_{rim} = (I \rho C_s)^{1/2} \quad (5)$$

Assuming that the optical fiber 61 is located under an ambient pressure $P_{amb}$ (that is normally the atmospheric pressure), the inequality (2) corresponds to the following inequality:

$$(P_{amb} - P(r)) - P' < 0 \quad (6)$$

Figure 22:
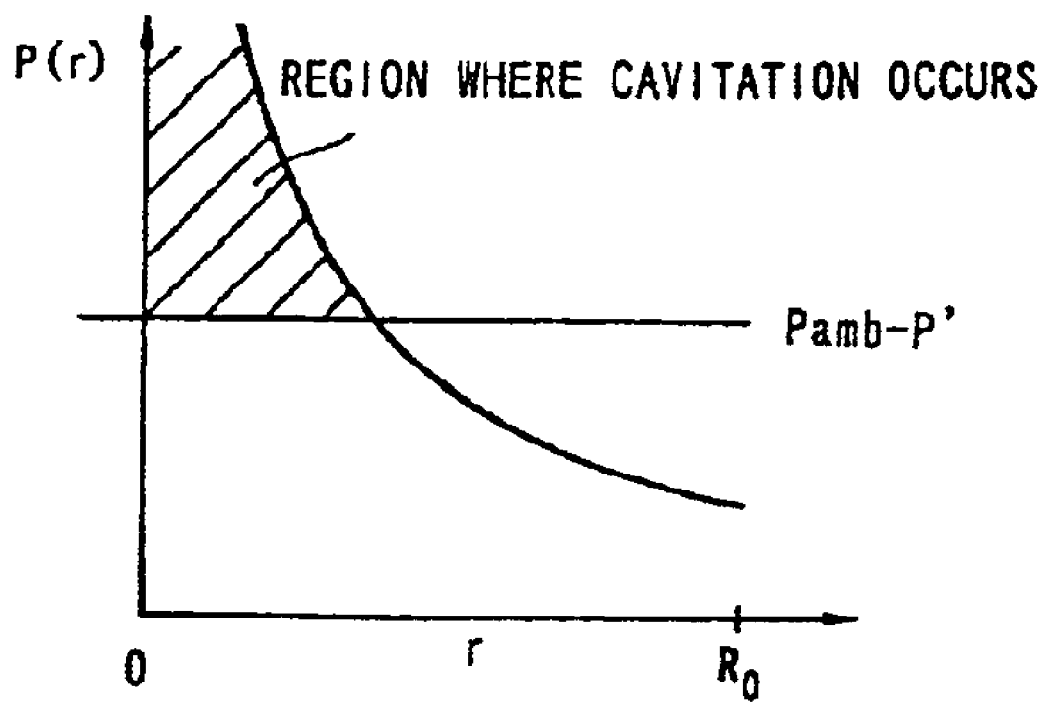
FIG. 22 is a schematic diagram for explaining conditions for generating cavitation in the core of an optical fiber in the flat color display according to the sixth embodiment of the invention.

The left side of the inequality (6) can be negative because, as shown in FIG. 22, P(r) exceeds $P_{amb} - P'$ when r is sufficiently small.

It will be appreciated from Inequality (6) that the use of a liquid exhibiting a high saturation vapor pressure under the atmospheric pressure is desirable for decreasing the power of ultrasonic waves to be generated by the piezoelectric element.

Here is shown an example of ultrasonic waves power to be generated by the piezoelectric element forming the control signal line 62. In case that cavitation occurs at the position of r=10 $\mu$m and generates bubbles, when $R_0$=100 $\mu$m, cavitation occurs at I(r)=0.3 W/cm$^2$, for example. Therefore, Equation (3) 1 ads to $I_{rim}=(r/R_0)I=(10/100)\cdot 0.3 = 0.03$ W/cm$^2$.

Figure 23:
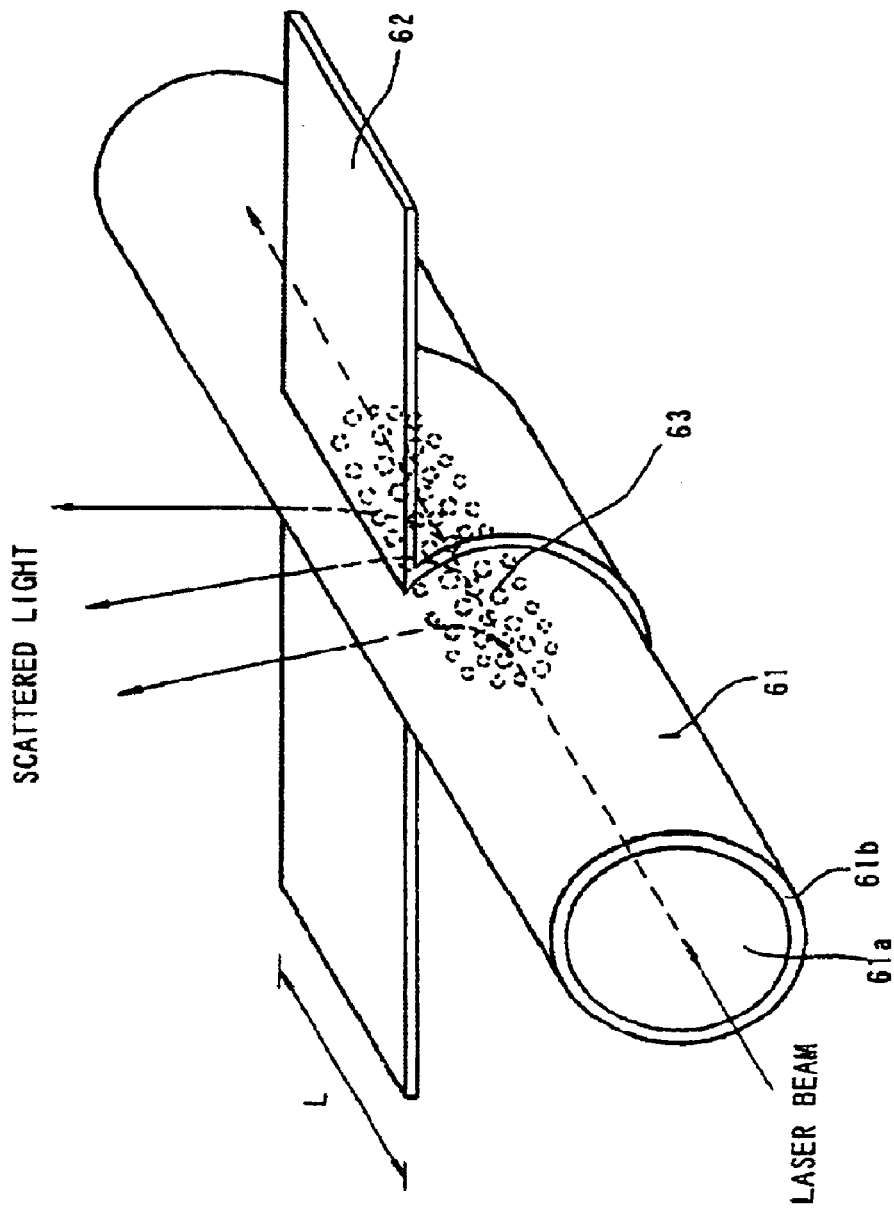
FIG. 23 is a schematic diagram that shows an aspect of light scattered by bubbles generated by cavitation in the core of an optical fiber in the flat color display according to the sixth embodiment of the invention.

FIG. 23 shows how incident light (laser beams) propagating through the optical fiber 61 is scattered by bubbles 63 produced by cavitation in the core 61a of a pixel scatter, and then led out outside the display side of the optical fiber 61. This aspect corresponds to the luminous state of this pixel.

When the power to the piezoelectric element is removed, it results in P(r)=0, and Inequality (6) is not satisfied, and light is guided inside the optical fiber 61 without being scattered. This aspect corresponds to the OFF state of the pixel.

When the diameter (2$R_0$) of the optical fiber 61 is 200 $\mu$m, the time required for switching light is the order of $R_0/C_s$~0.1 $\mu$sec, and sufficiently short, taking $C_s$~1 km/s into consideration. Since the time for controlling HDTV signals in line sequence is approximately ~10 $\mu$sec, in comparison with this, that switching speed is ten times higher, approximately.

Figure 24:
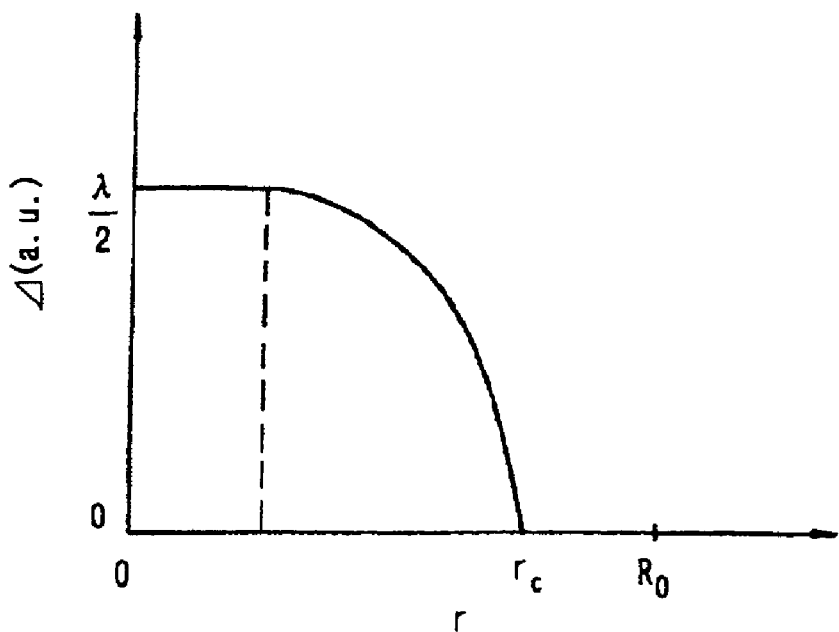
FIG. 24 is a schematic diagram that shows changes in space length required for generating bubbles in the core of an optical fiber by cavitation with distance in the radius vector direction of the optical fiber in the flat color display according to the sixth embodiment of the invention.

FIG. 24 shows a profile of space length $\Delta$ in the radius vector direction, with which Inequality (6) is satisfied. In Inequality (6), assume that its inequality sign changes to the equality sign when the value of r is $r_c$. Then, $$(P_{amb} - P(r_c)) - P' = 0 \quad (7)$$

In infinitely small bubbles 63 begin to generate at $r_c$. In a central portion of the optical fiber 61, i.e. at r~0, $\Delta$ becomes a half of the wavelength $\lambda$ of the ultrasonic waves. Size (diameter) of the bubble is proportional to $\Delta$.

Figure 25:
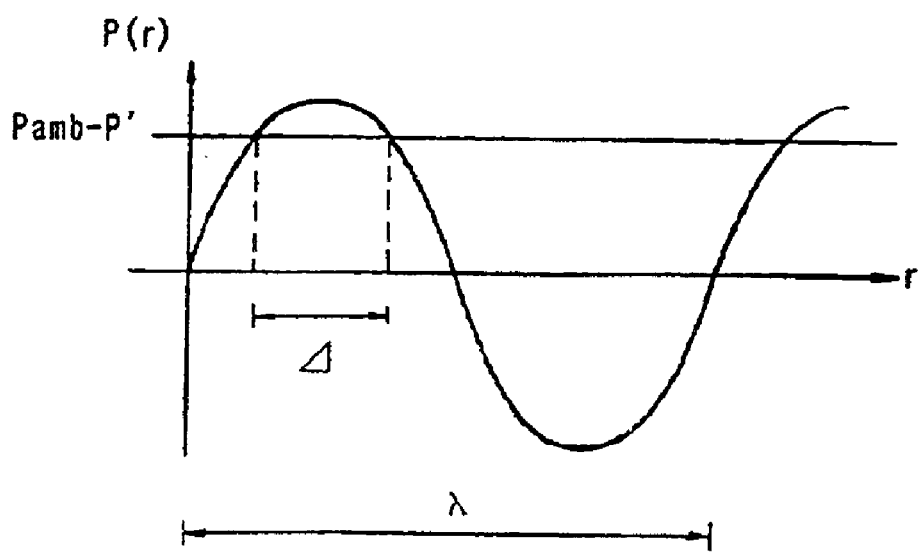
FIG. 25 is a schematic diagram that shows changes in space length required for generating bubbles in the core of an optical fiber by cavitation with distance in the radius vector direction of the optical fiber in the flat color display according to the sixth embodiment of the invention.

Instead of being random, the bubbles 63 can be distributed symmetrically about the center axis of the optical fiber 61 as shown in FIG. 25, for example, by appropriately designing the configuration of the contact surface of the control signal line 62 as the piezoelectric element with the optical fiber 61.

As apparent from Equations (3) through (6), $r_c$ can be controlled by adjusting the sonic intensity I of ultrasonic waves generated by the control signal line 62 as the piezoelectric element.

Number of bubbles $N_c$ generated in each pixel by cavitation can be expressed as follows when L=1 mm, $r_c$=100 $\mu$m.

$$N_c \sim L \pi r_c^2 / \lambda^3 \sim 1 \text{ mm} \cdot \pi \cdot (100 \ \mu m)^2 / (20 \ \mu m)^3 \sim 4 \times 10^3 / \text{pixels} \cdot \text{columns}$$

That is, approximately 4000 bubbles 63 are typically generated for each of R, G and B in each pixel. Here is assumed that, when ν is the frequency of the ultrasonic waves, $\lambda = C_s/\nu \sim 1 \text{ km/s}/50 \text{ MHz} \sim 10^3/5 \times 10^7 = 2 \times 10^{-5}$ m = 20 μm.

Figure 26:
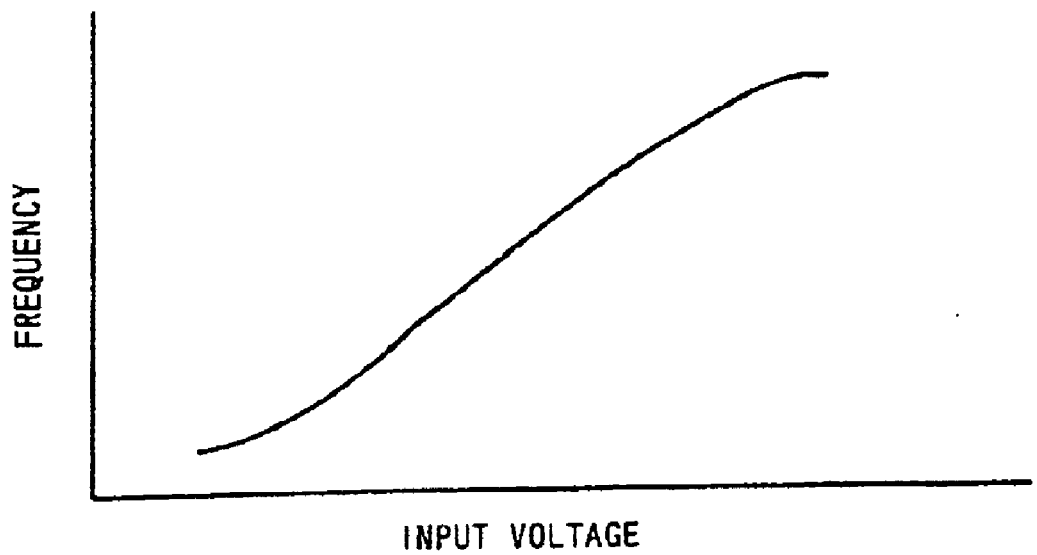
FIG. 26 is a schematic diagram that shows a dependency of the frequency of ultrasonic waves generated by a piezoelectric element forming a control signal line upon input voltage in the flat color display according to the sixth embodiment of the invention.

Frequency ν of the ultrasonic waves, i.e. the wavelength λ, can be controlled by adjusting the input voltage to the piezoelectric element. An example of dependency of the frequency of ultrasonic waves upon the input voltage is shown in FIG. 26. For example, by using a voltage controlled crystal oscillator (VCXO) as the piezoelectric element, the output frequency can be controlled by the input voltage, and the wavelength λ of the ultrasonic waves generated by the piezoelectric element can be controlled.

Gravitational movements of the bubbles generated by cavitation can be disregarded. For example, velocity of a bubble of a size around several mm in water is in the order of 1 cm/s, but that of a bubble with a size of μm is slower. Movable distance of a bubble 63 within μsec, which is the characteristic time scale for optical switching in the flat color display is not larger than the order of 10 nm. This is only one hundred thousands of the pixel size, and can be disregarded.

Based on those mechanisms, next explained is a method of operating the flat color display according to the sixth embodiment. In response to an image signal, specified R, G, B optical fibers 61 and a control signal line 62 are selected. By driving the semiconductor laser 13 at the ends of the selected optical fibers 61, laser beams from the semiconductor laser 13 are introduced into the cores 61a of the optical fibers 61, and a predetermined voltage is applied from the selected control signal line 62 across the pair of metal electrodes 62a, 62b of the control signal line 62 to drive the piezoelectric element, thereby causing cavitation and generating bubbles 63 in the cores 61a. Then, red, green and blue laser beams introduced into respective optical fibers 61 are scattered by these bubbles 63, scattered beams of light are led out ahead the display plane. As a result, a desired color image is displayed.

On the other hand, signals by each horizontal scan of the control signal line 62 is input as laser light each CCD line sensor 14, and the input pieces of information are sequentially accumulated in the shift register to sequentially store one-frame information.

Next explained is a flat color display according to the seventh embodiment of the invention.

Figure 27:
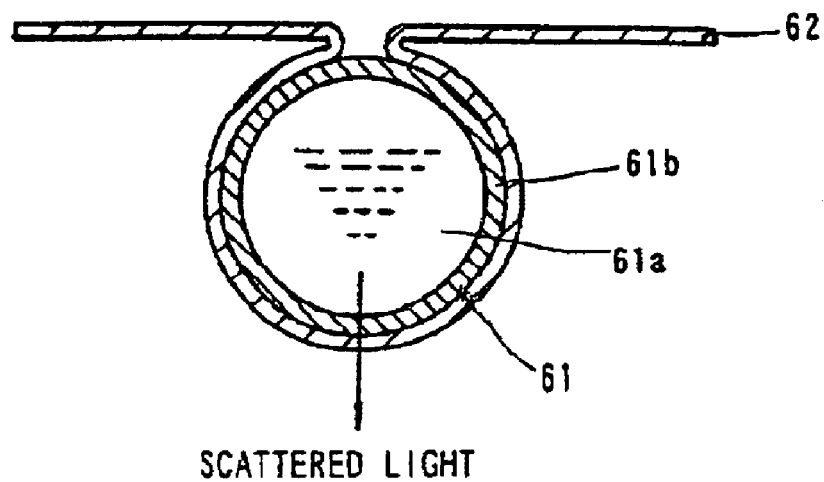
FIG. 27 is a cross-sectional view of an intersection point of an optical fiber and a control signal line in the flat color display according to the seventh embodiment of the invention.

The flat color display is different from the first embodiment in structure of the intersection of each optical fiber 61 and the control signal line 62. More specifically, in the seventh embodiment, as shown in FIG. 27, at each intersection point of the control signal line 62 with the optical fiber 61, the control signal line 62 made of a piezoelectric element defines a concave plane in contact with the outer circumferential surface of the optical fiber 61 excluding a part of the circumference facing the display plane of the display. In this case, the control signal line 62 as the piezoelectric element is made of a transparent material such that light scattered in the core 61a can be efficiently led out externally through the control signal line 62. As the transparent piezoelectric material 62c of the piezoelectric element, a transparent polymer, such as PVDF, for example, may be used, and ITO, for example, can be used as the transparent electrode.

In the other respects, the seventh embodiment is the same as the sixth embodiment, and explanation thereof is omitted here.

The seventh embodiment ensures the same advantages as those of the first embodiment.

Next explained is a flat color display according to the eighth embodiment of the invention.

Figure 28:
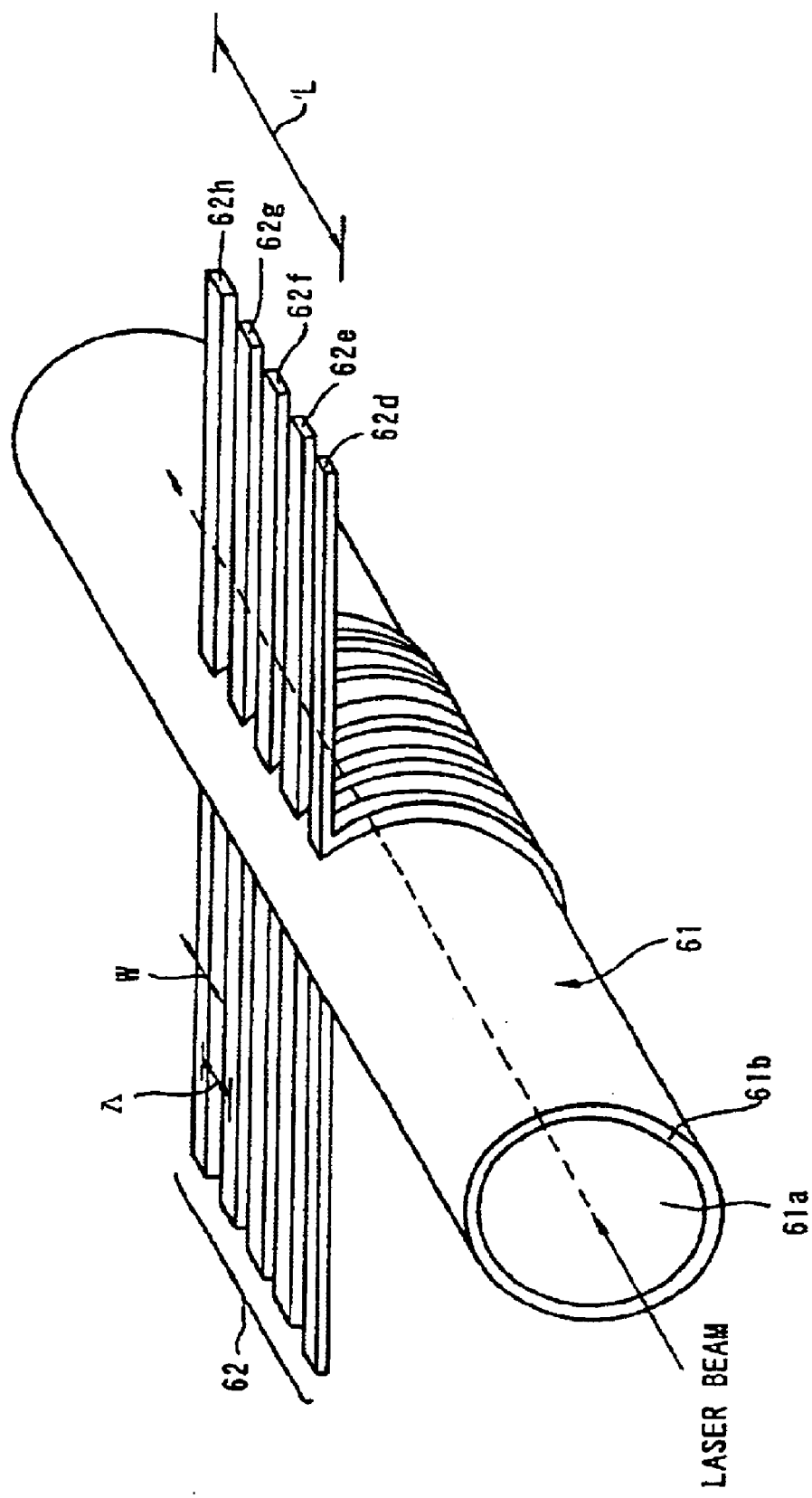
FIG. 28 is a cross-sectional view of an intersection point of an optical fiber and a control signal line in a flat color display according to the eighth embodiment of the invention.

As shown in FIG. 28, in the flat color display, the control signal line 62 made up of a piezoelectric element is divided into stripes 62d, 62e, 62f, 62g and 62h each having the width W and aligned at intervals Λ in their width direction. Stripes 62d, 62f and 62h of the piezoelectric element are supplied with a voltage opposite in phase from a voltage applied to the stripes 62e and 62g.

In the other respects, the eighth embodiment is the same as the sixth embodiment, and explanation thereof is omitted here.

The eighth embodiment ensures the same advantages as those of the first embodiment. Additionally, the following advantage can be obtained as well.

Figure 29:
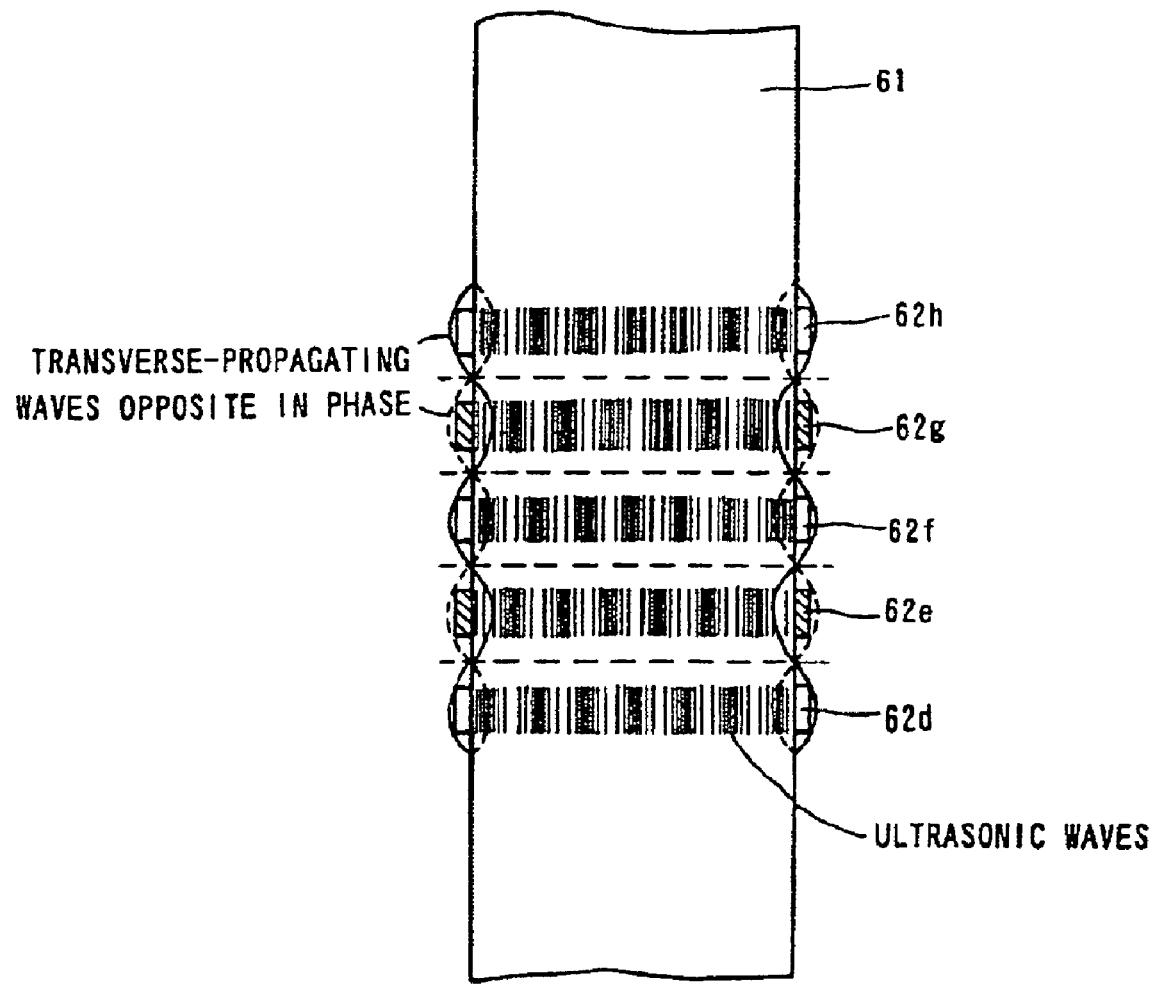
FIG. 29 is a cross-sectional view that shows an aspect of propagation of ultrasonic waves to an optical fiber in the flat color display according to the eighth embodiment of the invention.

FIG. 29 shows an aspect of propagation of ultrasonic waves upon driving the piezoelectric element by applying voltages opposite in phase to the group of the stripes 62d, 62f, 62h of the piezoelectric element and the group of the stripes 62e, 62g of the piezoelectric element and thereby generating ultrasonic waves. At that time, since every adjacent stripes of the piezoelectric element among the stripes 62d, 62e, 62f, 62g and 62h are driven by voltages opposite in phase, propagation of ultrasonic waves in the lengthwise direction of the optical fiber 61 can be prevented. Therefore, ultrasonic waves can be locally limited to the portions of the stripes 62d, 62e, 62f, 62g and 62h, and cavitation by ultrasonic waves can be limited inside each single pixel. In other words, cross talk between pixels adjacent in the lengthwise direction of the optical fiber 61 can be prevented. Additionally, since the stripes 62d, 62e, 62f, 62g and 62h periodically aligned at intervals Λ in the lengthwise direction of the optical fiber 61 function as diffraction gratings, scattering of light in the lengthwise direction by bubbles generated in the core 61a of the optical fiber 61 can be enhanced, and light can be efficiently led out externally.

Next explained is a flat color display according to the ninth embodiment of the invention.

Figure 30:
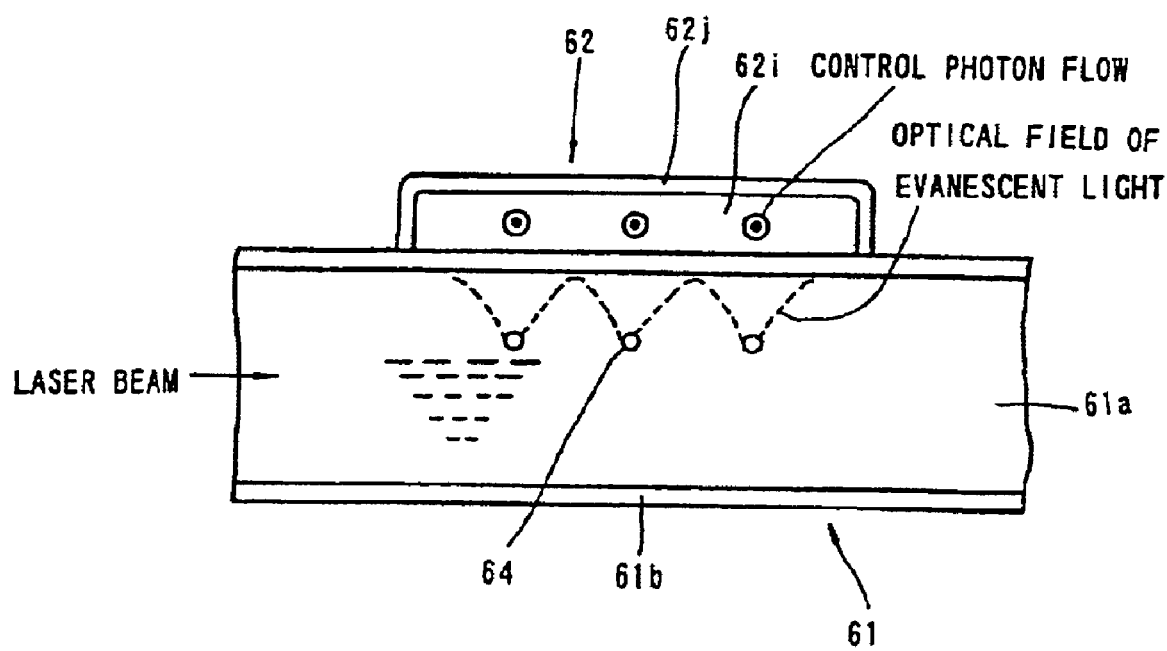
FIG. 30 is a cross-sectional view of an intersection point of an optical fiber and a control signal line in a flat color display according to the ninth embodiment of the invention.

As shown in FIG. 30, in the flat color display, the core 61a of each optical fiber 61 is made of a liquid containing fine particles 64 dispersed therein as light scattering elements (a kind of sol). Each signal line 62 is an optical control element made up of an optical waveguide 62i and a cladding 62j covering it, and it intersects with each optical fiber 61 and contact with a part of its outer circumferential surface.

In the flat color display, a control photon flow is generated in the optical waveguide 62i of each control signal line 62 as shown in FIG. 30. As a result, evanescent light is generated in a part of the optical fiber 61 in contact with the optical waveguide 62i, and the evanescent light functions to move the fine particles dispersed in the liquid forming the core 61a of the optical fiber 61 to positions corresponding to the positions of photons traveling through the optical waveguide 62i. Especially when the fine particles 64 are those of a polar organic compound having a dipole moment, for example, it is also possible to change orientation of the fine particles 64 under a function of the electric field of the evanescent light. Using these mechanisms, it is possible to efficiently scatter the laser beams introduced into the optical fiber 61 and efficiently lead out the light externally.

In the other respects, the ninth embodiment is the same as the first embodiment, and explanation thereof is omitted here.

The ninth embodiment ensures the same advantages as those of the first embodiment.

Next explained is a photon operation device according to the tenth embodiment of the invention. This photon operation device is shown in FIG. 31.

Figure 31:
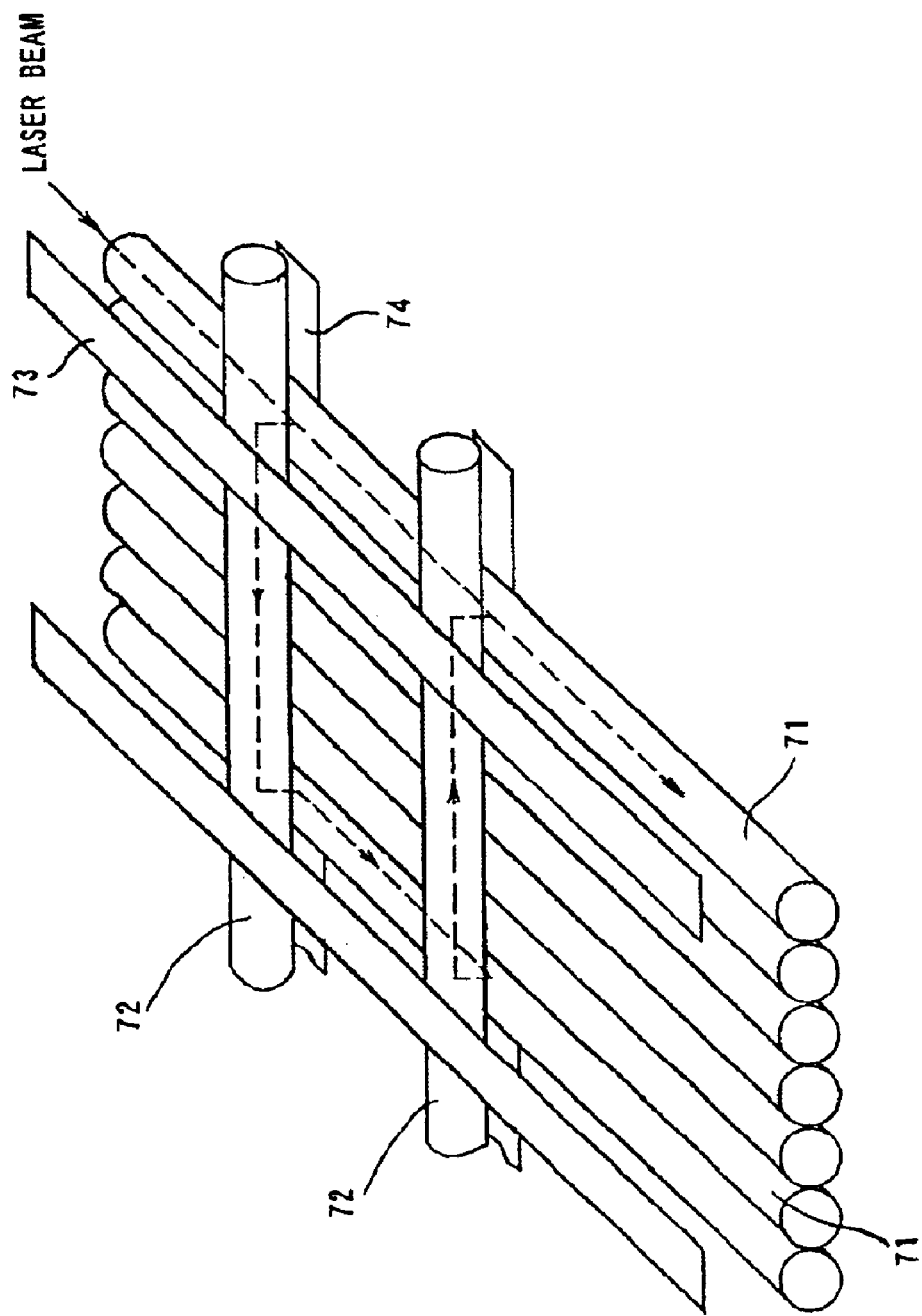
FIG. 31 in a schematic diagram that shows a photon arithmetic device according to the tenth embodiment of the invention.

As shown in FIG. 31, the photon operation device is made up of a plurality of optical fibers 71, 72 aligned vertically and horizontally. In this respect, it is the same as the flat color display according to the first embodiment. It is noticeable, however, that these optical fibers 71, 72 have plastic or glass cores but each cladding thereof is made of a liquid crystal. At rest, refractive index of the liquid crystal forming the cladding is lower than the refractive index of the core. These optical fibers 71, 72 are optically coupled at their crossing points. Electrodes 73 extending in parallel with the optical fibers 71 and electrodes 74 extending in parallel with the optical fibers 72 are provided to sandwich the optical fibers 71, 72 from their top and bottom surfaces to enable application of a voltage across these electrodes 73, 74. These electrodes 73, 74 form optical switches. At one-side ends of the optical fibers 71, semiconductor lasers (not shown) are provided as light sources such that laser beams from the semiconductor lasers can be introduced into end surfaces of the optical fibers 71.

In the photon operation device, as shown in FIG. 31, a laser beam is introduced into the core at one end of a selected optical fiber 71, depending on an operation to be performed. Then, a voltage is applied across selected electrodes 73, 74 to apply an electric field to an intersection between the optical fiber 71 and the optical fiber 72. By application of the electric field controls orientation of molecules of the liquid crystal forming the claddings of the optical fibers 71, 72 to change the refractive index of the claddings higher than the refractive index of the cores. As a result, part of the laser beam introduced from one end of the optical fiber 71 exits the optical fiber 71, then enters into the core of the optical fiber 72 and travels therein. The remain part of the laser beam remain in and travels through the optical fiber 71. That is, the laser beam introduced from one end of the optical fiber 71 is divided by optical switches, which are electrodes 73, 74, and correlated dual signals are obtained. Next, the light transmitted through the optical fiber 72 similarly enters in another optical fiber 71 and it is transmitted through the optical fiber 71. Then, the light transmitted through the optical fiber 71 enters into another optical fiber 72, finally enters into the first optical fiber 71 and joins with the laser beam first introduced into the optical fiber 71. At that time, midway of the path of part of the laser beam introduced from one end of the optical fiber 71, which is led out outside the optical fiber 71 by the optical switch and finally joins with the laser beam inside the optical fiber 71, a phase shift is intentionally introduced to invite interference of light by concourse of the light, and operation can be executed by using it. That is, interference operation of the branch photon beam can be executed.

According to the tenth embodiment, parallel information processing can be conducted collectively for the entire plane.

Next explained is a photon operating device according to the eleventh embodiment of the invention. This photon operating device uses quantum transportation. This photon operating device is illustrated in FIG. 32.

Figure 32:
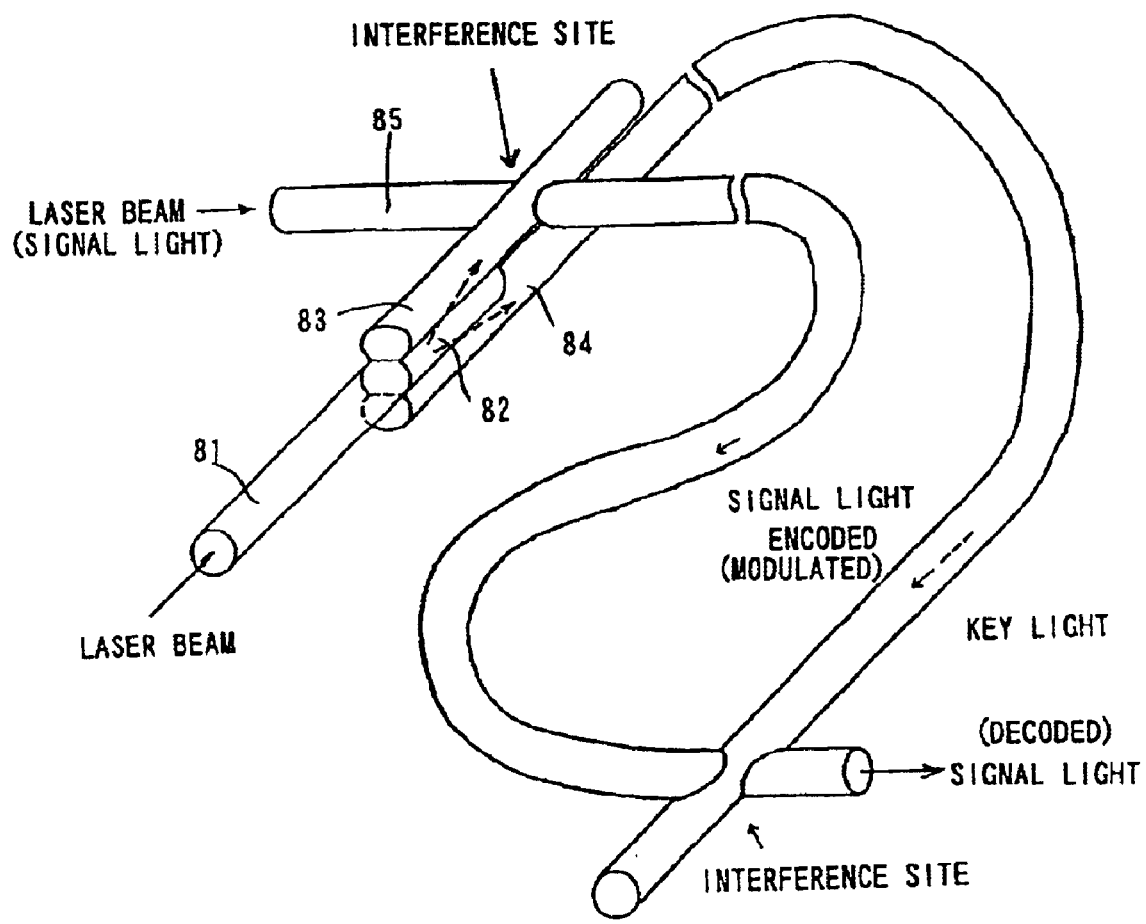
FIG. 32 is a schematic diagram that shows a photo operating device according to the eleventh embodiment of the invention.

As shown in FIG. 32, in the photon operating device, an optical fiber 82, made of a nonlinear material capable of generating secondary harmonics, is coupled to one end of the optical fiber 81. Optical fibers 83, 84 are integrally coupled to the optical fiber 82 above and below it. An optical fiber 85 is provided to intersect with the optical fiber 83. This optical fiber 85 is integrally coupled to the optical fiber 83 at the intersection point therewith. An extension of the optical fiber 85 intersects with an extension of the optical fiber 84, and integrally couples therewith.

In the photon operating device shown here, a laser beam is introduced as signal light from one end of the optical fiber 85. On the other hand, a laser beam is introduced into the optical fiber 81. Once this laser beam (wavelength ω) enters into the optical fiber 82, it is divided into two photon with the wavelength of 2ω due to the nonlinear effect, and they enter into the overlying and underlying optical fibers 83, 84, respectively. The photon having entered into the optical fiber 83 joins with signal light introduced into the optical fiber 85 at the intersection between the optical fiber 83 joins with signal light introduced into the optical fiber 85 at the intersection between the optical fiber 83 and the optical fiber 85. Resulting interference light carries information of the signal light. This photon is transmitted through the optical fiber 85, and joins with the other photon having been produced by the nonlinear effect and having entered into the optical fiber 84, at the intersection between the optical fiber 85 and the optical fiber 84. As a result, signal light is reproduced as quantum transportation at the other end of the optical fiber 85.

According to the optical operating device, quantum transportation can be realized on an integrated device. This can be the basis not only of quantum cryptography but also of a quantum computer.

Having described specific preferred embodiments of the present invention with reference to the accompanying drawings, it is to be understood that the inventions is not limited to those precise embodiments, and that various changes and modifications may be effected therein by one skilled in the art without departing from the scope or the spirit of the invention as defined in the appended claims.

For example, numerical values, structures, materials, source materials, processes and others proposed in the foregoing embodiments are not but mere examples, and different numerical values, structures, materials, source materials and processes and others may be used as well.

For example, in the sixth embodiment, each control signal line 62 has a piezoelectric element structure as a whole; however, the control signal line 62 may have the piezoelectric element structure only at the very intersection with the optical fiber 61 while maintaining the remainder portion as the wiring area.

In the eighth embodiment, although each control signal line 62 is divided into five stripes; however, the divisional number is not limited to this, and may be determined as desired. Additionally, the stripes need not be equally spaced, and it is rather more advantageous to place the stripes at unequal intervals from the viewpoint of alleviating the directivity of diffraction.

In the ninth embodiment, although the core 61a of each optical fiber 61 is made of a liquid containing fine particles 64 dispersed therein, and the fine particles 64 are controlled in position or orientation by an optical field of evanescent light leaking out into the optical fiber 61, the embodiment can be modified to use the same control signal lines in form of piezoelectric elements as those of the sixth embodiment such that ultrasonic waves generated by each control signal line 62 propagate from the outer circumferential surface of the optical fiber 61 and control positions of the fine particles 64.

As described above, according to the invention, the device and method can more effectively use five senses and muscular or other functions humans have, and can perform various kinds of information processing as high-level interface connecting image information of natural worlds and human brains.

Additionally, according to the invention, it is possible to provide a photon operating device simple in structure, easy to increase the screen area, unlikely to produce distortion along edges of the display plane during reproduction of a large solid angle image when the screen area is large-scaled, quickly responsive, capable of changing the shape of the display plane to various shapes including a concave shape, if necessary, extendible, light, thin and flexible.

Furthermore, the photon operating device can function as an information processing device using quantum-mechanical entanglement.

What is claimed is:

1. A photon operating device characterized in using dual signals correlated to each other, which are obtained by dividing a photon beam, wherein paths of photons are provided by a plurality of first optical fibers and a plurality of second optical fibers or optical waveguides that are disposed in a form of a grating in a two-dimensional plane, the second optical fibers or optical waveguides contacting along and partially surrounding a length of an arc of an outer circumferences of the first optical fibers at an intersection thereof, wherein a photon beam introduced into a selected one of said first optical fibers is divided at said intersection to create said dual signals correlated to each other, one of said dual signals being transmitted through within said selected first optical fiber, the other of said dual signals being led out from said selected first optical fiber externally of said two-dimensional plane at said intersection, and wherein the one of said dual signals, which is an inversion signal of the other of said dual signals led out externally of said two-dimensional plane, is stored in storage means synchronously with leading out the other of said dual signals externally of said two-dimensional plane.

2. The photon operating device according to claim 1 wherein the other of said dual signals being led out from said selected first optical fiber externally of said two-dimensional plane and again introduced into said selected first optical fiber via a selected one of said plurality of second optical fibers or optical waveguides to join with said one of the dual signals.

3. The photon operating device according to claim 1 wherein the other of said dual signals led out externally of said two-dimensional plane is an image signal.

4. The photon operating device according to claim 1 wherein said image signal is recognized and/or analyzed by acquiring difference in time and/or space of said inversion signal.

5. The photon operating device according to claim 1 wherein a result of recognition and/or analysis of said image signal is fed back to an image signal for the next display.

6. The photon operating device according to claim 1 wherein said inversion signal contains information about optical intensity, color or polarization.

7. The photon operating device according to claim 1 wherein said inversion signal is used for analysis of time and space for physical access to said two-dimensional plane from the exterior.

8. The photon operating device according to claim 7 wherein said physical access is an external pressure.

9. The photon operating device according to claim 7 wherein a position of said physical access on said two-dimensional plane is detected by using the other of said dual signals as a guide signal for a user and using said inversion signal as a signal carrying information for said physical access.

10. The photon operating device according to claim 1 wherein a light source and a photo detector are disposed at one and the other ends of each of said first optical fibers.

11. The photon operating device according to claim 10 wherein said photo detector is connected to a shift register.

12. The photon operating device according to claim 10 wherein said light source is a semiconductor laser or a light emitting diode.

13. The photon operating device according to claim 10 wherein said photo detector is a charge coupled device.

14. The photon operating device according to claim 1 wherein an optical switch is used to lead out the other of said dual signals externally of said two-dimensional plane.

15. A photon operating device using dual signals correlated to each other, which are obtained by dividing a photon beam, comprising:

a plurality of first optical fibers and a plurality of second optical fibers or optical waveguides that are disposed in a form of a grating in a two-dimensional plane, the second optical fibers or optical waveguides contacting along and partially surrounding a length of an arc of an outer circumferences of the first optical fibers at an intersection thereof; and a light source of a plurality of light sources and a photo detector of a plurality of photo detectors disposed at one and the other ends of each of said first optical fibers, a photon beam introduced from said light source into a selected one of said plurality of first optical fibers being divided at the intersection of said first optical fiber and said second optical fiber or optical waveguide by an optical switch using light-to-light interaction to create dual signals correlated to each other, one of which dual signals is a first signal transmitted through within said selected first optical fiber, and the other of which dual signals is a second signal led out from said selected first optical fiber externally of said two-dimensional plane, said first signal led out from the other end of said selected first optical fiber being detected by one of said photo detectors, wherein the one of said dual signals, which is an inversion signal of the other of said dual signals led out externally of said two-dimensional plane, is stored in storage means synchronously with leading out the other of said dual signals externally of said two-dimensional plane.

16. The photon operating device according to claim 15 wherein said light source is a semiconductor laser.

17. The photon operating device according to claim 15 wherein said first optical fibers include those for red, those for green and those for blue, a light source for red emission being provided at one end of each of said first optical fibers for red, a light source for green emission being provided at one end of each of said first optical fibers for green, and a light source for blue emission being provided at one end of each of said first optical fibers for blue.

18. The photon operating device according to claim 17 wherein said light source for red emission, said light source for green emission and said light source for blue emission are semiconductor lasers.

19. The photon operating device according to claim 15 wherein said first optical fibers and said second optical fibers or optical waveguides are disposed to form a curved plane.

20. A photon operating method characterized in using dual signals correlated to each other, which are obtained by dividing a photon beam, wherein paths of photons are provided by a plurality of first optical fibers and a plurality of second optical fibers or optical waveguides that are disposed in a form of a grating in a two-dimensional plane, the second optical fibers or optical waveguides contacting along and partially surrounding a length of an arc of an outer circumferences of the first optical fibers at an intersection thereof, and wherein a photon beam introduced into a selected one of said first optical fibers is divided at said intersection to create said dual signals correlated to each other, one of said dual signals being transmitted through within said selected first optical fiber, the other of said dual signals being led out from said selected first optical fiber externally of said two-dimensional plane at said intersection, and wherein the one of said dual signals, which is an inversion signal of the other of said dual signals led out externally of said two-dimensional plane, is stored in storage means synchronously with leading out the other of said dual signals externally of said two-dimensional plane.

* * * * *